(12) United States Patent
Ji et al.

(10) Patent No.: US 9,546,926 B2
(45) Date of Patent: Jan. 17, 2017

(54) METHOD OF INSPECTING A LIGHT SOURCE MODULE FOR DEFECTS, METHOD OF MANUFACTURING A LIGHT SOURCE MODULE, AND APPARATUS FOR INSPECTING A LIGHT SOURCE MODULE

(71) Applicant: SAMSUNG ELECTRONICS CO., LTD., Suwon-si, Gyeonggi-do (KR)

(72) Inventors: Won Soo Ji, Hwaseong-si (KR); Oh Seok Kwon, Hwaseong-si (KR); Dae Seo Park, Suwon-si (KR); Ka Ram Lee, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 2 days.

(21) Appl. No.: 14/581,147

(22) Filed: Dec. 23, 2014

(65) Prior Publication Data

US 2015/0355053 A1    Dec. 10, 2015

(30) Foreign Application Priority Data

Jun. 9, 2014  (KR) .................. 10-2014-0069234

(51) Int. Cl.
*G01J 1/00*   (2006.01)
*G01M 11/02*  (2006.01)
*G01J 1/42*   (2006.01)

(52) U.S. Cl.
CPC ............ *G01M 11/0278* (2013.01); *G01J 1/42* (2013.01); *G01M 11/0257* (2013.01); *G01J 2001/4252* (2013.01)

(58) Field of Classification Search
CPC .......... H04N 7/18; G01N 21/00; G01B 21/00; G01J 1/02; G01J 1/58
(Continued)

(56) References Cited

U.S. PATENT DOCUMENTS 5,403,773 A     4/1995  Nitta et al.
5,801,822 A  *  9/1998  Lafferty ............. G01M 11/0207
                                                356/124

(Continued)

FOREIGN PATENT DOCUMENTS

JP    06-029577 B2    4/1994
JP    2011-040376 A   2/2011
(Continued)

OTHER PUBLICATIONS

Japanese Office Action issued in Application No. 2015-047430 dated Nov. 10, 2015.

*Primary Examiner* — Tarifur Chowdhury
*Assistant Examiner* — Isiaka Akanbi
(74) *Attorney, Agent, or Firm* — Lee & Morse P.C.

(57) ABSTRACT

A method for inspecting a light source module for defects includes preparing a board on which a light emitting device and a lens covering the light emitting device are installed. A current is applied to the light emitting device to turn on the light emitting device. The lens is imaged with the light emitting device turned on. A central symmetry denoting a symmetry of light emission distribution from the center of the lens is calculated based on the obtained image, and the calculated central symmetry is compared with a reference value to determine whether unsymmetrical light emission distribution has occurred. Various other methods and apparatuses for inspecting light source modules are additionally provided.

19 Claims, 23 Drawing Sheets

(58) Field of Classification Search
USPC ........ 356/121, 421, 610, 603, 445; 348/129, 348/135, 125, 92
See application file for complete search history.

(56) References Cited

U.S. PATENT DOCUMENTS

| | | | |
|---|---|---|---|
| 5,818,573 A * | 10/1998 | Lafferty | ............ G01M 11/0221 356/127 |
| 6,372,608 B1 | 4/2002 | Shimoda et al. | |
| 6,645,830 B2 | 11/2003 | Shimoda et al. | |
| RE38,466 E | 3/2004 | Inoue et al. | |
| 6,818,465 B2 | 11/2004 | Biwa et al. | |
| 6,818,530 B2 | 11/2004 | Shimoda et al. | |
| 6,858,081 B2 | 2/2005 | Biwa et al. | |
| 6,967,353 B2 | 11/2005 | Suzuki et al. | |
| 7,002,182 B2 | 2/2006 | Okuyama et al. | |
| 7,084,420 B2 | 8/2006 | Kim et al. | |
| 7,087,932 B2 | 8/2006 | Okuyama et al. | |
| 7,154,124 B2 | 12/2006 | Han et al. | |
| 7,208,725 B2 | 4/2007 | Sherrer et al. | |
| 7,288,758 B2 | 10/2007 | Sherrer et al. | |
| 7,319,044 B2 | 1/2008 | Han et al. | |
| 7,501,656 B2 | 3/2009 | Han et al. | |
| 7,535,557 B2 | 5/2009 | Wu et al. | |
| 7,709,857 B2 | 5/2010 | Kim et al. | |
| 7,759,140 B2 | 7/2010 | Lee et al. | |
| 7,766,509 B1 | 8/2010 | Laporte | |
| 7,781,727 B2 | 8/2010 | Sherrer et al. | |
| 7,790,482 B2 | 9/2010 | Han et al. | |
| 7,940,350 B2 | 5/2011 | Jeong | |
| 7,950,832 B2 | 5/2011 | Tanaka et al. | |
| 7,959,312 B2 | 6/2011 | Yoo et al. | |
| 7,964,881 B2 | 6/2011 | Choi et al. | |
| 7,985,976 B2 | 7/2011 | Choi et al. | |
| 7,994,525 B2 | 8/2011 | Lee et al. | |
| 8,008,683 B2 | 8/2011 | Choi et al. | |
| 8,013,352 B2 | 9/2011 | Lee et al. | |
| 8,049,161 B2 | 11/2011 | Sherrer et al. | |
| 8,129,711 B2 | 3/2012 | Kang et al. | |
| 8,179,938 B2 | 5/2012 | Kim | |
| 8,263,987 B2 | 9/2012 | Choi et al. | |
| 8,324,646 B2 | 12/2012 | Lee et al. | |
| 8,348,461 B2 | 1/2013 | Wilcox et al. | |
| 8,399,944 B2 | 3/2013 | Kwak et al. | |
| 8,432,511 B2 | 4/2013 | Jeong | |
| 8,441,643 B2 * | 5/2013 | Son | .................. G02F 1/133606 356/432 |
| 8,456,768 B2 | 6/2013 | Shih et al. | |
| 8,459,832 B2 | 6/2013 | Kim | |
| 8,502,242 B2 | 8/2013 | Kim | |
| 8,511,864 B2 | 8/2013 | Holder et al. | |
| 8,536,604 B2 | 9/2013 | Kwak et al. | |
| 8,735,931 B2 | 5/2014 | Han et al. | |
| 8,766,295 B2 | 7/2014 | Kim | |
| 2006/0022214 A1 | 2/2006 | Morgan et al. | |
| 2007/0201225 A1 | 8/2007 | Holder et al. | |
| 2011/0013393 A1 | 1/2011 | Ishio et al. | |
| 2011/0027918 A1 * | 2/2011 | Tanaka | .................. G09G 3/006 438/16 |
| 2011/0195531 A1 * | 8/2011 | Sohn | ........................ G01J 1/04 438/16 |
| 2012/0249776 A1 * | 10/2012 | Ji | ....................... G01R 31/2635 348/125 |
| 2012/0316825 A1 | 12/2012 | Shigemitsu et al. | |

FOREIGN PATENT DOCUMENTS

| | | |
|---|---|---|
| JP | 2011-134932 A | 7/2011 |
| JP | 2012-238410 A | 12/2012 |
| JP | 2013-171113 A | 9/2013 |
| KR | 10-2009-0116024 A | 11/2009 |
| KR | 10-2011-0055992 A | 5/2011 |
| KR | 10-2012-0104912 A | 9/2012 |
| KR | 10-1291914 B1 | 7/2013 |
| KR | 101291914 B1 * | 7/2013 |

* cited by examiner

| | ROW IMAGE | PROCESSED IMAGE |
|---|---|---|
| ACCEPTABLE |  |  |
| DEFECTIVE |  |  |
| |  |  |
| |  |  |
| |  |  |

| | ROW IMAGE | PROCESSED IMAGE |
|---|---|---|
| ACCEPTABLE |  |  |
| DEFECTIVE |  |  |
| |  |  |

METHOD OF INSPECTING A LIGHT SOURCE MODULE FOR DEFECTS, METHOD OF MANUFACTURING A LIGHT SOURCE MODULE, AND APPARATUS FOR INSPECTING A LIGHT SOURCE MODULE

CROSS-REFERENCE TO RELATED APPLICATION

This application claims the benefit of Korean Patent Application No. 10-2014-0069234 filed on Jun. 9, 2014, with the Korean Intellectual Property Office, the disclosure of which is incorporated herein by reference.

BACKGROUND

The present disclosure relates to a method of inspecting a light source module for defects, a method of manufacturing a light source module, and an apparatus for inspecting a light source module.

Voice of the customer (VOC) expectations have been adopted in the fields of light emitting diode (LED) displays and lighting, and here, value engineering (VE) influenced designs, aimed at reducing the thickness and costs associated with associated devices is important. In this regard, lenses are device elements that commonly satisfy the requirements of VE design. Such lenses serve to reduce an optical distance between an LED and a target plane and increase a pitch (space, distance, or gap) between LEDs.

Precisely assembling a lens and an LED is difficult, and may give rise to problems such as lens shift, caused as the center of the LED and the center of the lens are misaligned, and lens tilt, caused in cases in which a lens is tilted with respect to a horizontal plane. These assembly precision defects may result in optical uniformity defects known as mura. In addition, optical uniformity defects may also be caused due to problems in a lens itself or in a manufacturing process thereof.

SUMMARY

An aspect of the present disclosure may provide a method of inspecting and removing causes of optical uniformity defects such as mura in the manufacturing of a light source module to enhance the reliability of products and productivity in the manufacturing thereof.

However, aspects of the present disclosure are not limited thereto and aspects and effects that may be recognized from technical solutions or embodiments described hereinafter may also be included although not explicitly mentioned.

According to an aspect of the present disclosure, a method of inspecting a light source module for defects may include preparing a board having thereon a light emitting device and a lens covering the light emitting device. A current is applied to the light emitting device to turn on the light emitting device on. The lens with the light emitting device turned on is imaged to obtain an image of the lens. Central symmetry denoting symmetry of light emission distribution from the center of the lens is calculated based on the obtained image, and the calculated central symmetry is compared with a reference value to determine whether unsymmetrical light emission distribution has occurred.

The calculating of central symmetry may include setting an inspection region in the obtained image, dividing the inspection region into a plurality of sub-regions, and calculating central symmetry based on brightness of each of the divided sub-regions.

In the setting of the inspection region, a region including areas located at a predetermined distance from a center of the lens may be set as the inspection region.

The dividing of the inspection region into the plurality of sub-regions may include first dividing the inspection region into a plurality of tracks each including areas located within a predetermined range of distances from the center of the lens, and secondly dividing each of the plurality of tracks radially into the plurality of sub-regions.

The current applied in the operation of turning on the light emitting device may be a current equal to or more than 50% of a rated current for driving the light emitting device.

The method may further include determining central coordinates of the light emitting device mounted on the board, determining central coordinates of the lens from the obtained image of the lens, comparing the central coordinates of the light emitting device and the central coordinates of the lens to calculate an offset value, and comparing the offset value with a reference value to determine whether lens misalignment has occurred.

The determining of central coordinates of the lens may include recognizing fiducial markers formed on the board and the position of the lens from the obtained image, determining the central coordinates of the lens based on identifying edges of the lens in the obtained image, and converting the central coordinates of the lens into actual coordinates based on the fiducial markers.

The determining of central coordinates of the light emitting device may be performed after the light emitting device is mounted on the board and before the lens is installed to cover the light emitting device.

The light emitting device mounted on the board may be a plurality of light emitting devices, the plurality of light emitting devices may be arranged in a longitudinal direction of the board, and the imaging, calculating, and comparing steps may be performed individually for each light emitting device of the plurality of light emitting devices.

The light emitting device may be a light emitting diode (LED) chip or an LED package including an LED chip.

According to another aspect of the present disclosure, a method of inspecting a light source module for defects may include preparing a board having thereon a light emitting device and a lens covering the light emitting device A current to the light emitting device to turn on the light emitting device. The lens is imaged with the light emitting device turned on to obtain an image of the lens. Central coordinates of the lens are determined from the obtained image of the lens. Central coordinates of the light emitting device are compared with the determined central coordinates of the lens to calculate an offset value between the central coordinates, and the offset value is compared with a reference value to determine whether lens misalignment has occurred.

The method may further include determining the central coordinates of the light emitting device mounted on the board, wherein the step for determining the central coordinates of the light emitting device may be performed after the light emitting device is mounted on the board and before the lens is installed to cover the light emitting device.

According to another aspect of the present disclosure, a method of manufacturing a light source module may include determining central coordinates of a light emitting device mounted on a board. A lens is installed to cover the light emitting device, and a current is applied to the light emitting device to turn on the light emitting device. The lens covering the light emitting device is imaged with the light emitting device turned on to obtain an image of the lens, and central coordinates of the lens are determined from the obtained image of the lens. The central coordinates of the light emitting device are compared with the central coordinates of the lens to calculate an offset value between the central coordinates, and the offset value is compared with a reference value to determine whether a lens is misaligned.

The determining of the central coordinates of the light emitting device may be performed using automatic optical inspection (AOI) equipment.

The determining of central coordinates of the lens may include recognizing fiducial markers formed on the board and the position of the lens from the obtained image, determining the central coordinates of the lens based on identifying edges of the lens in the obtained image, and converting the central coordinates of the lens into actual coordinates based on the fiducial markers.

The method may further include determining whether unsymmetrical light emission distribution has occurred from the light emitting device, wherein the determining whether unsymmetrical light emission distribution has occurred may include calculating central symmetry denoting a symmetry of light emission distribution from the center of the lens based on the obtained image, and comparing the calculated central symmetry with a reference value to determine whether unsymmetrical light emission distribution has occurred.

The determining whether lens misalignment has occurred in the light emitting device and the determining whether a lens is misaligned may be performed based on the same obtained image.

The installing of the lens may include attaching the lens to the board using an adhesive.

The light emitting device mounted on the board may include a plurality of light emitting devices, the plurality of light emitting devices are arranged in a longitudinal direction of the board.

In the method of manufacturing a light source module, the steps for determining central coordinates, for installing a lens, for imaging the lens, and for calculating central symmetry may be performed individually for each light emitting device of the plurality of light emitting devices.

BRIEF DESCRIPTION OF DRAWINGS

The above and other aspects, features, and other advantages of the present disclosure will be more clearly understood from the following detailed description taken in conjunction with the accompanying drawings, in which.

DETAILED DESCRIPTION

Figure 1:
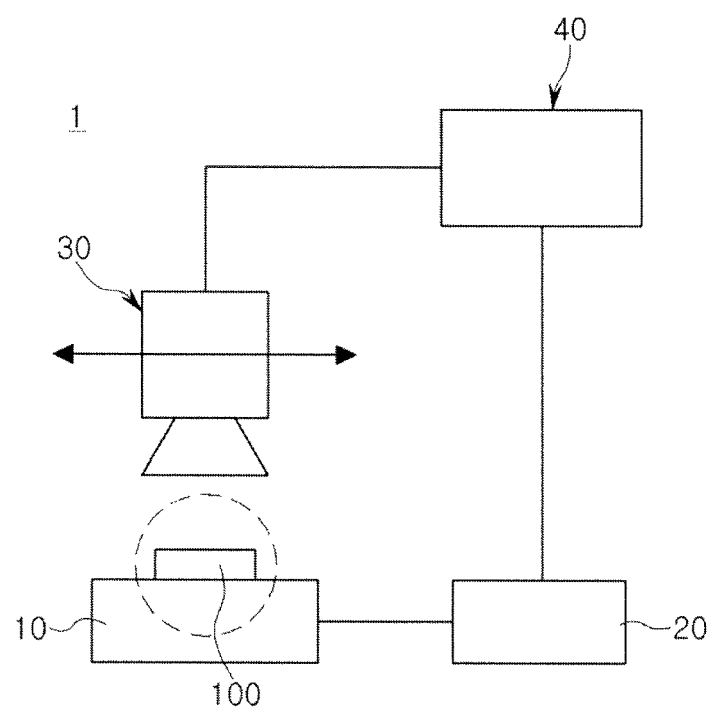
FIG. 1 is a block diagram schematically illustrating an apparatus for inspecting a light source module according to an example embodiment in the present disclosure.

Hereinafter, example embodiments in the present disclosure will be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

FIG. 1 schematically illustrates an apparatus for inspecting a light source module according to an example embodiment in the present disclosure. Specifically, FIG. 1 is a block diagram illustrating the apparatus for inspecting the light source module according to the example embodiment in the present disclosure.

As illustrated in FIG. 1, an apparatus 1 for inspecting a light source module (or a light source module inspecting apparatus 1) according to an illustrative embodiment in the present disclosure may include a mount 10, a power source 20, an imager 30, and a controller 40.

Figure 2A:
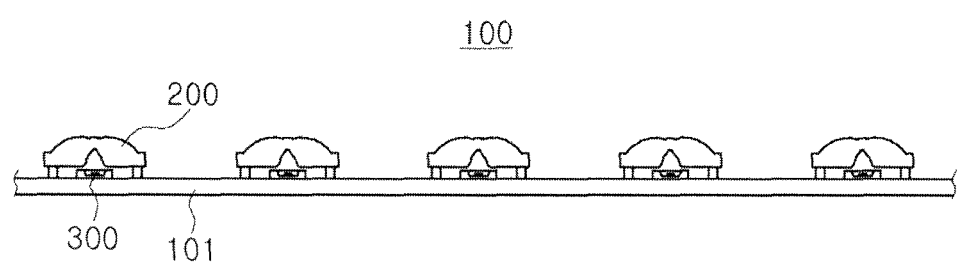
FIGS. 2A and 2B are a cross-sectional view and a plan view schematically illustrating a light source module according to an example embodiment in the present disclosure.
Figure 2B:
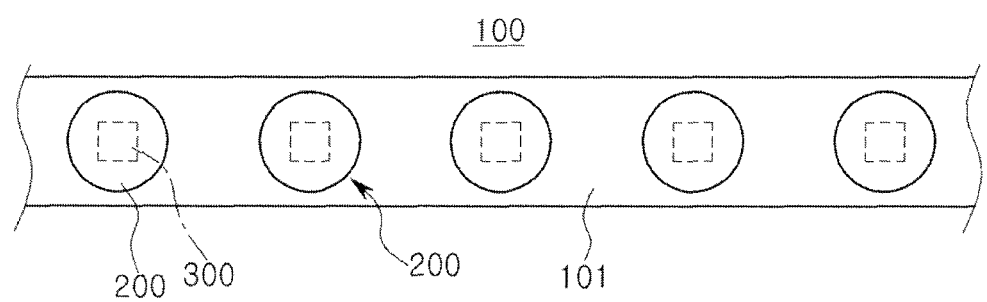

In order to inspect a light source module 100, the light source module 100 may be turned on and directly imaged, and a determination can be made as to whether the light source module is defective based on the captured image. FIGS. 2A and 2B schematically illustrate the light source module as a target to be inspected. The light source module 100 may include a board 101, a light emitting device 300 mounted on the board 101, and a lens 200 covering the light emitting device 300.

Referring to FIG. 1, the mount 10 supports the light source module 100 as an inspection target. The board 101 allows the light emitting device 300 and the lens 200 to be mounted thereon. A single or a plurality of boards 101 may be arranged on a carrier, and the carrier may be disposed on one surface of the mount 10.

The power source 20 may apply a current to the light emitting device 300 to turn the light emitting device 300 on. The power source 20 may be driven by a signal applied from the outside and may turn on or off the light emitting device 300 serving as the inspection target.

With the light emitting device 300 turned on, the imager 30 may image the lens 200 to obtain an image. A camera, for example, may be used as the imager 30, but the present disclosure is not limited thereto and any other device may be used as long as it can image an object and thereby obtain an image thereof.

The imager 30 may be disposed above the mount 10 and may move to the location of the light emitting device 300 and the lens 200 serving as imaging targets (e.g., a location vertically above the light emitting device 300 and the lens 200) to obtain an image while the light emitting device 300 is in a turned-on state.

The controller 40 may store the image obtained through the imager 30 as data, and compare the data with a stored reference value to determine whether a corresponding light emitting device is defective. The controller 40 may process the obtained image, and a raw image captured through the imager 30 and a processed image obtained by processing the raw image may be respectively stored as data in the controller 40.

The controller 40 may control driving of the imager 30 and the power source 20. The reference value may be stored by a user in the controller 40.

Inspection may be performed to determine whether the light source module 100 is defective through the light source module inspecting apparatus 1. In this case, two types of inspections may be performed.

One of the two types of inspections may be an inspection of lens misalignment (or lens shift). An offset value indicating a degree of offset of a center of the light emitting device 300 and a center of the lens 200 is a major cause of mura resulting from non-uniform brightness, and the offset value is therefore generally determined.

The other may be an inspection of unsymmetrical light emission distribution (or optical shift). Even without a lens misalignment, mura may be generated when the lens 200 is tilted with respect to be assembly or when the lens 200 itself is defective, for example. These causes may be inspected only through optical information.

Figure 3:
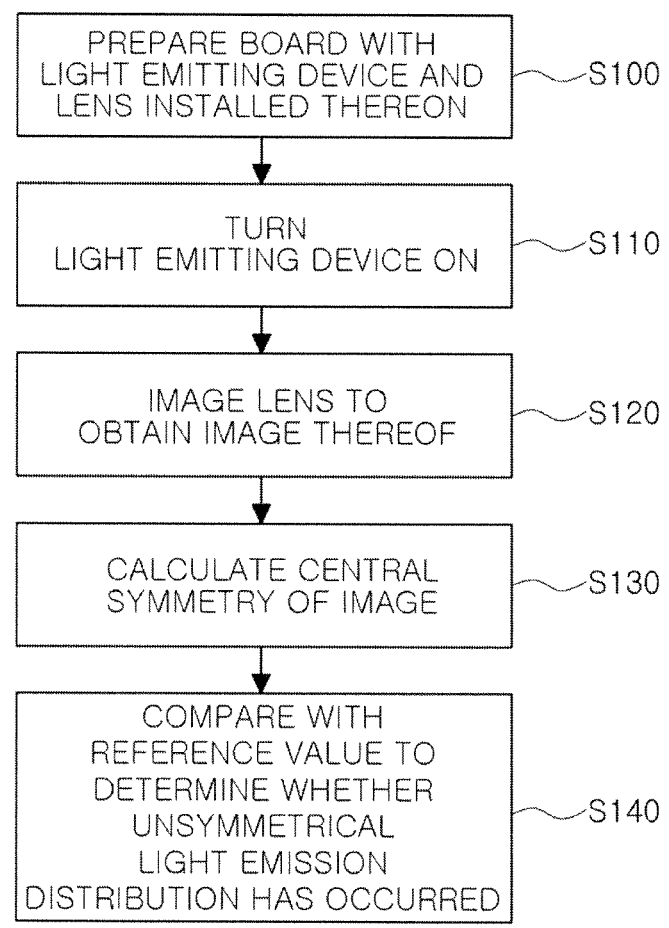
FIG. 3 is a flow chart schematically illustrating a method of inspecting a light emission distribution (or identifying an unsymmetrical light emission distribution (optical shift)) as part of inspecting a light source module.

A method of inspecting a light source module and a method of inspecting a defective light emission distribution (or unsymmetrical light emission distribution (optical shift)) according to an example embodiment in the present disclosure will be described with reference to FIG. 3 together with FIG. 1. FIG. 3 is a flow chart schematically illustrating a method of inspecting an unsymmetrical light emission distribution in a method of inspecting a light source module. Inspection of unsymmetrical light emission distribution may be performed by imaging a turned-on light emitting device and analyzing a captured image to determine whether unsymmetrical light emission distribution has occurred.

First, the board 101 on which the light emitting device 300 is mounted and on which the lens 200 is installed to cover the light emitting device 300 is prepared in operation S100. The board 101 with the light emitting device 300 and the lens 200 provided thereon is disposed on the mount 10 of the light source module inspecting apparatus 1 of FIG. 1. In this case, the board 101, in a state of being placed on the carrier, may be disposed on the mount 10.

When the light source module 100, serving as an inspection target, is disposed on the mount 10, a current is applied by the power source 20 to the light emitting device 300 to turn the light emitting device 300 on in operation S110. In general, the current is applied by the power source 20 to the light emitting device 300 via electrical contacts included in the mount 10. Here, the current applied to turn the light emitting device 300 on may be a current equal to or greater than 50% of a rated current for driving the light emitting device 300. Namely, the light emitting device 300 may be turned on by applying a rated current or a current smaller than the rated current.

The current applied to the light emitting device 300 may be variously adjusted through the power source 20, and the power source 20 may be driven and controlled by a signal delivered from the controller 40.

Next, with the light emitting device 300 turned on, the lens 200 is imaged through the imager 30 to obtain an image thereof in operation S120. The controller 40 may move the imager 30 to be positioned directly above the light emitting device 300 and the lens 200. The imager 30 may then image the lens 200 to obtain an image of the light emitting device 300 in a turned-on state.

Thereafter, central symmetry (denoting symmetry of a light emission distribution from the center of the lens 200 based on the obtained image) is calculated through the controller 40 in operation S130. In one example, a raw image and a processed image may be stored as data in the controller 40, and the controller 40 may calculate central symmetry using the processed image.

The process of calculating the central symmetry may be performed as follows. First, a region to be inspected (or an inspection region) is set in the image obtained through the imager 30. In this case, for example, a region located at a predetermined distance from the center of the lens 200 may be set as an inspection region. After the inspection region is set, the inspection region is divided into a plurality of sub-regions. In this case, the inspection region may first be divided into a plurality of tracks depending on the distances from the center of the lens 200 and each of the plurality of tracks may be secondly divided radially into the plurality of sub-regions. Each track can include areas located within a predetermined range of distances from the center of the lens. After the inspection region is divided into a plurality of sub-regions, central symmetry may be calculated based on luminance (or brightness) of each of the divided sub-regions.

Thereafter, the controller 40 compares the calculated central symmetry with a reference value to determine whether unsymmetrical light emission distribution has occurred in the light source module 100 in operation S140. The reference value may be stored by the user in the controller 40 and may be variously modified depending on required design conditions. Here, the determination of a defect may include a determination of a type of a defect, as well as a determination of the presence and absence of a defect.

In this manner, an inspection for identifying an unsymmetrical light emission distribution may be performed. The inspection is performed based on a phenomenon in which optical features that appear when a current is applied to turn on the light emitting device vary depending on an assembly state or the characteristics of the lens itself. Thus, compared to a conventional inspection method that allows for determining only the presence and absence of a defect through a captured image, the inspection of unsymmetrical light emission distribution according to the present example embodiment is advantageous in that a type of defect which has occurred, as well as the presence and absence of a defect, may also be identified. Also, since appropriate measures may be taken accordingly, generation of an additional defect can be prevented.

Figure 4:
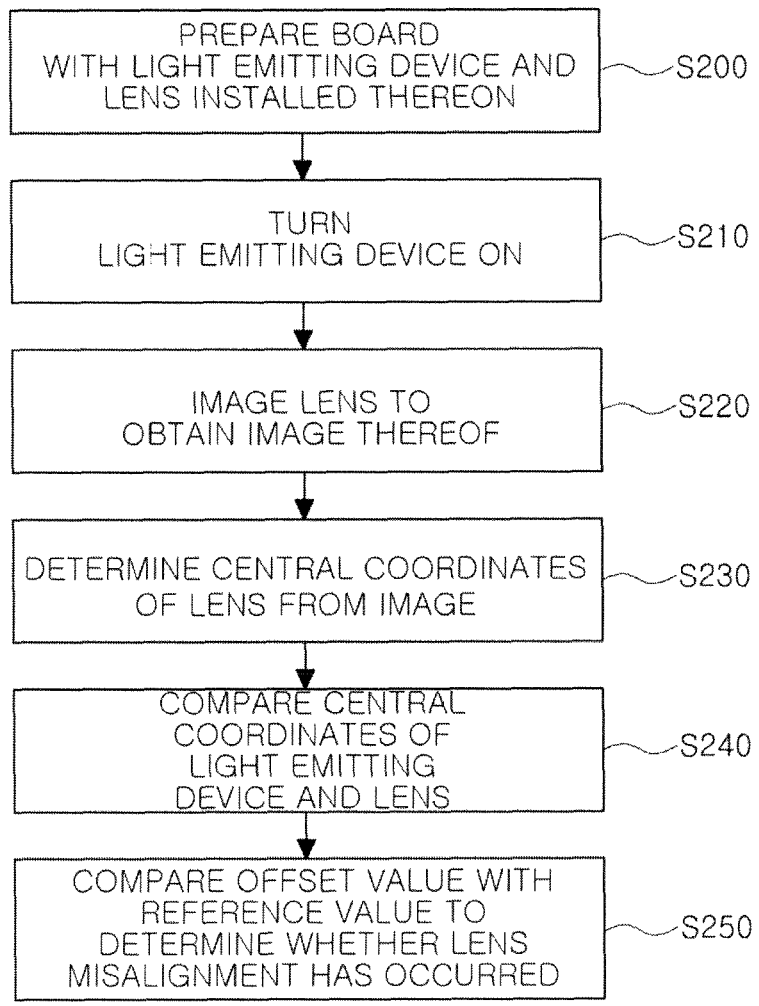
FIG. 4 is a flow chart schematically illustrating a method of inspecting a light source module for lens misalignment (or lens shift) as part of inspecting a light emission distribution in the light source module.

A method of inspecting lens misalignment (lens shift) in the method of inspecting a light source module will be described with reference to FIG. 4 together with FIG. 1. FIG. 4 is a flow chart schematically illustrating a method of inspecting a lens to identify lens misalignment. The method of FIG. 4 can be performed as part of performing the method of inspecting a lens to identify a light emission distribution defect in a method of inspecting a light source module. Similarly, inspection of a lens to identify lens misalignment may be performed by imaging a turned-on light emitting device and inspecting whether there is a lens misalignment based on the captured image.

First, the board 101 on which the light emitting device 300 is mounted and on which the lens 200 is installed to cover the light emitting device 300 is prepared in operation S200. The board 101 with the light emitting device 300 and the lens 200 provided thereon is disposed on the mount 10 of the light source module inspecting apparatus 1 of FIG. 1. In this case, the board 101, in a state of being placed on the carrier, may be disposed on the mount 10.

When the light source module 100 serving as an inspection target is disposed on the mount 10, a current is applied by the power source 20 to the light emitting device 300 to turn the light emitting device 300 on in operation S210. Here, the current applied to turn the light emitting device 300 on may be a current equal to or greater than 50% of a rated current for driving the light emitting device 300. Namely, the light emitting device 300 may be turned on by applying a rated current or a current smaller than the rated current.

The current applied to the light emitting device 300 may be variously adjusted through the power source 20, and the power source 20 may be driven and controlled by a signal delivered from the controller 40.

Next, with the light emitting device 300 turned on, the lens 200 is imaged by the imager 30 to obtain an image thereof in operation S220. The controller 40 may move the imager 30 to be positioned directly above the light emitting device 300 and the lens 200. The imager 30 may then image the lens 200 to obtain an image of the light emitting device 300 in a turned-on state.

Thereafter, the controller 40 determines central coordinates of the lens 200 from the obtained image of the lens 200 in operation S230. The process of determining central coordinates of the lens 200 may be performed as follows. First, a fiducial mark formed on the board 101 and a position of the lens 200 on the obtained image are recognized. Next, the central coordinates of the lens 200 are recognized using edges of the lens 200. The central coordinates of the lens 200 are then converted into actual coordinates based on the fiducial mark.

Thereafter, central coordinates of the light emitting device 300 and the determined central coordinates of the lens 200 are compared to calculate an offset value therebetween in operation S240. The offset value is compared with a reference value to determine whether the lens 200 has been shifted in operation S250.

The reference value may be stored in the controller by the user and may be variously modified depending on required design conditions. For example, the reference value may be set in consideration of an allowable error range, and thus, although the central coordinates are not aligned, the light emitting device may be admitted as being acceptable (good), rather than being defective, as long as the offset value satisfies the allowable error range.

The central coordinates of the light emitting device 300 may be determined through an automatic optical inspection (AOI). Determining of the central coordinates of the light emitting device 300 may be performed after the light emitting device 300 is mounted on the board 101 and before the lens 200 is installed to cover the light emitting device 300.

Figure 5:
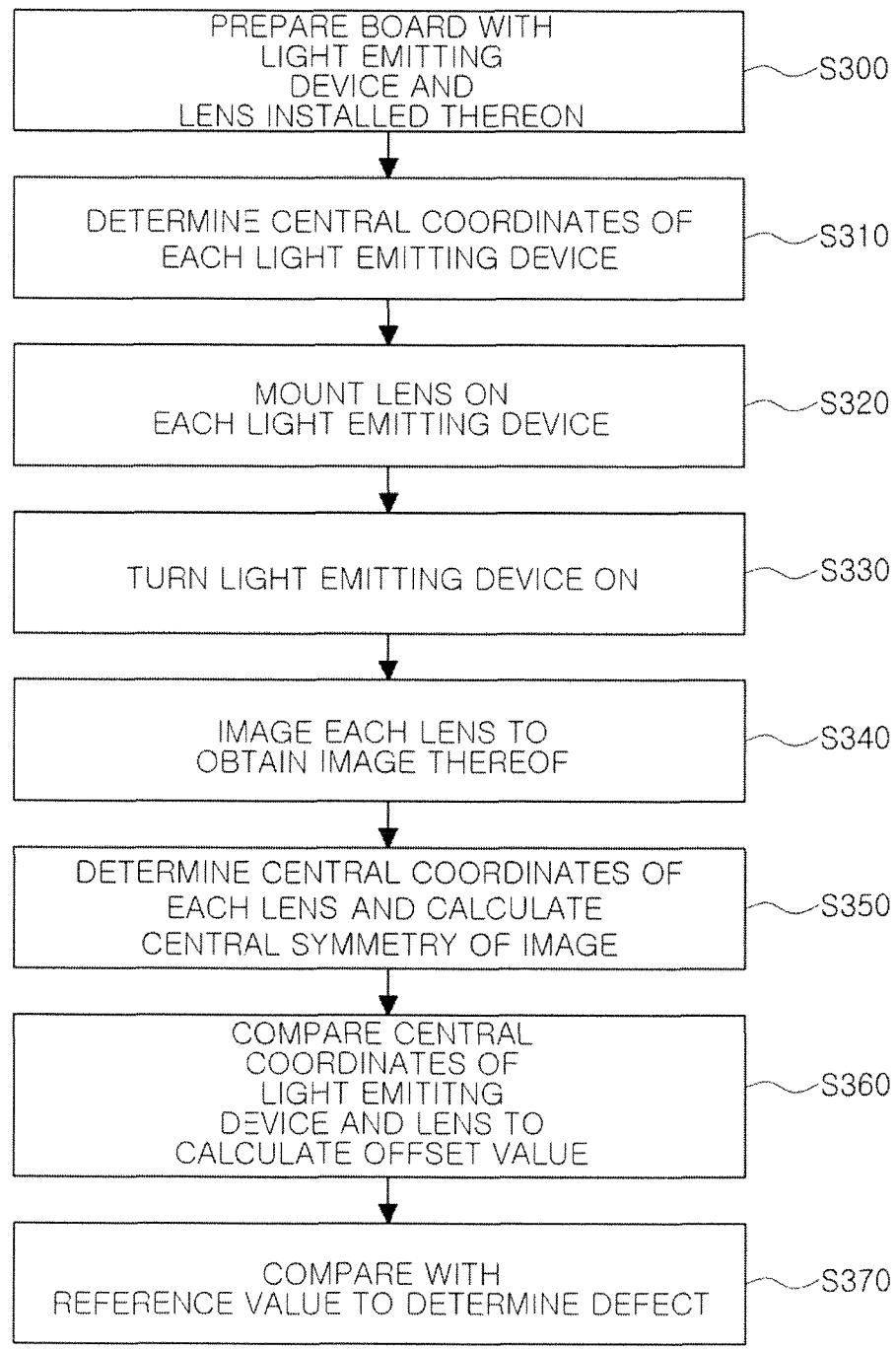
FIG. 5 is a flow chart schematically illustrating a method of manufacturing a light source module according to an example embodiment in the present disclosure.

A method of manufacturing a light source module according to an example embodiment in the present disclosure will be described with reference to FIGS. 5, 6A, 6B, 7 through 10, 11A and 11B. FIG. 5 is a flow chart schematically illustrating a method of manufacturing a light source module according to an example embodiment in the present disclosure, and FIGS. 6A, 6B, 7 through 10, 11A, and 11B schematically illustrate sequential manufacturing process steps for manufacturing a light source module.

Figure 6A:
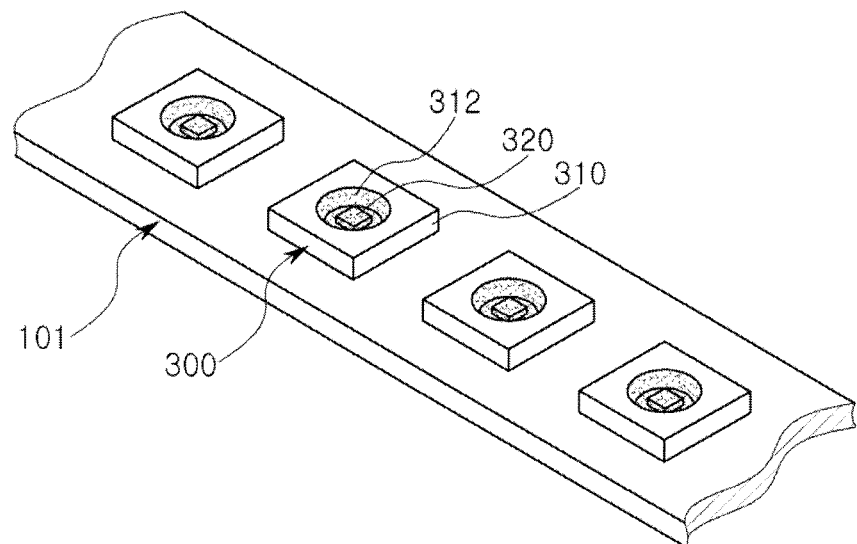
FIGS. 6A and 6B are a perspective view and a cross-sectional view schematically illustrating light emitting devices mounted on a board.
Figure 6B:
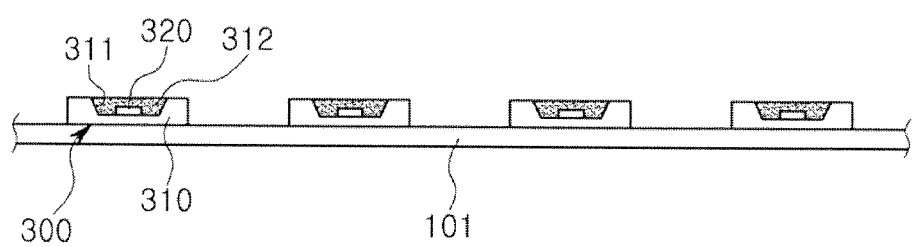

As illustrated in FIGS. 6A and 6B, a board 101 on which a plurality of light emitting devices 300 are mounted is prepared (operation S300 of FIG. 5).

The board 101 may be an FR4-type printed circuit board (PCB) or a flexible printed circuit board (FPCB) and may be formed of an organic resin material containing epoxy, triazine, silicon, polyimide, or the like, or any other organic resin material. The board 101 may also be formed of a ceramic material such as silicon nitride, AlN, $Al_2O_3$, or the like, or may be formed of a metal or metallic compound such as a metal-core printed circuit board (MCPCB), a metal copper clad laminate (MCCL), or the like.

The board 101 may have a bar-like rectangular shape elongated in a longitudinal direction. However, this is merely an example of a structure of the board 101 according to an example embodiment of the present disclosure and the present disclosure is not limited thereto.

A plurality of light emitting devices 300 may be mounted and arranged in a longitudinal direction on one surface of the board 101. The light emitting devices 300 may be photo-electric devices generating light having a predetermined wavelength through driving power applied from the outside. For example, the light emitting devices 300 may include a semiconductor light emitting diode (LED) including an n-type semiconductor layer, a p-type semiconductor layer, and an active layer disposed therebetween.

As the light emitting devices 300, LED chips having various structures or various types of LED packages including such LED chips may be used. For example, the light emitting devices 300 may have a structure in which an LED chip 320 is mounted within a package body 310 having a reflective cup 311. The LED chip 320 may be covered by a resin 312 containing a phosphor. In the present example embodiment, the light emitting devices 300 in the form of an LED package type are illustrated, but the present disclosure is not limited thereto.

Figure 7:
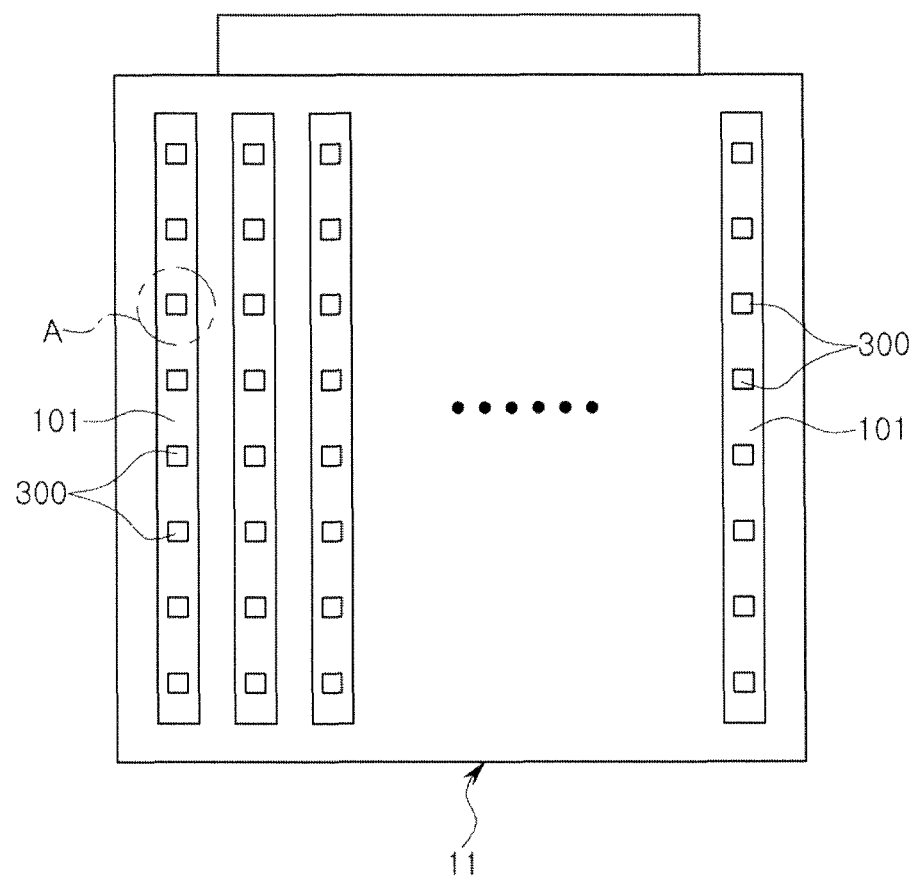
FIG. 7 is a plan view schematically illustrating boards, each with a plurality of light emitting devices mounted thereon, arranged on a carrier.

As illustrated in FIG. 7, a plurality of boards 101, on which a plurality of light emitting devices 300 are mounted, respectively, may be mounted and arranged on the carrier 11, for example. In one example, sixteen boards 101 may be arranged side by side in parallel to a longitudinal direction of the boards.

Next, central coordinates of the plurality of light emitting devices 300 mounted on the plurality of arranged boards 101 are determined (operation S310 of FIG. 5). The central coordinates of the light emitting devices 300 may be determined through an automatic optical inspection (AOI), for example.

Figure 8:
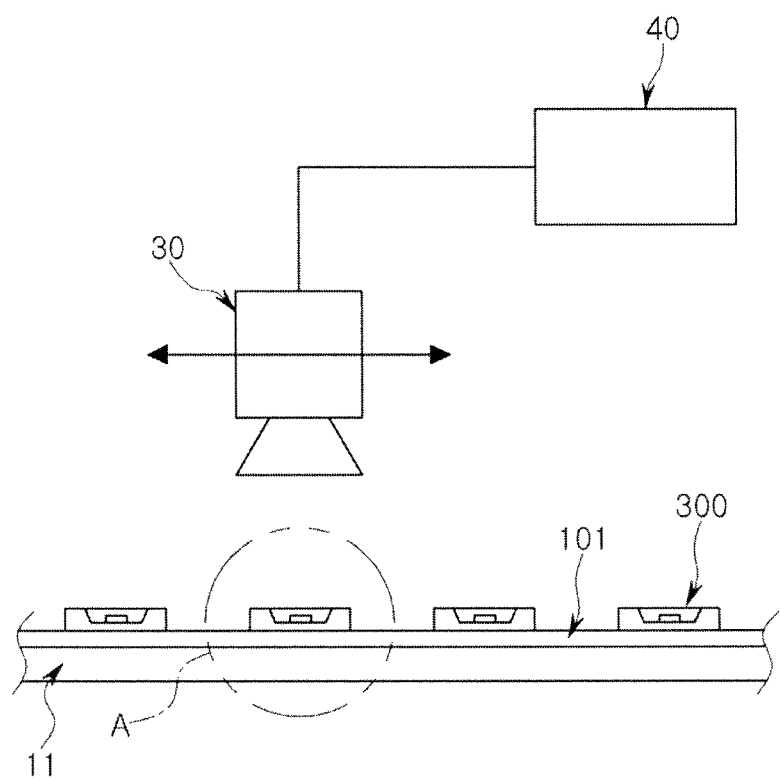
FIG. 8 is a cross-sectional view schematically illustrating a process for obtaining an image of a light emitting device such as one of those shown in FIG. 7.
Figure 9:
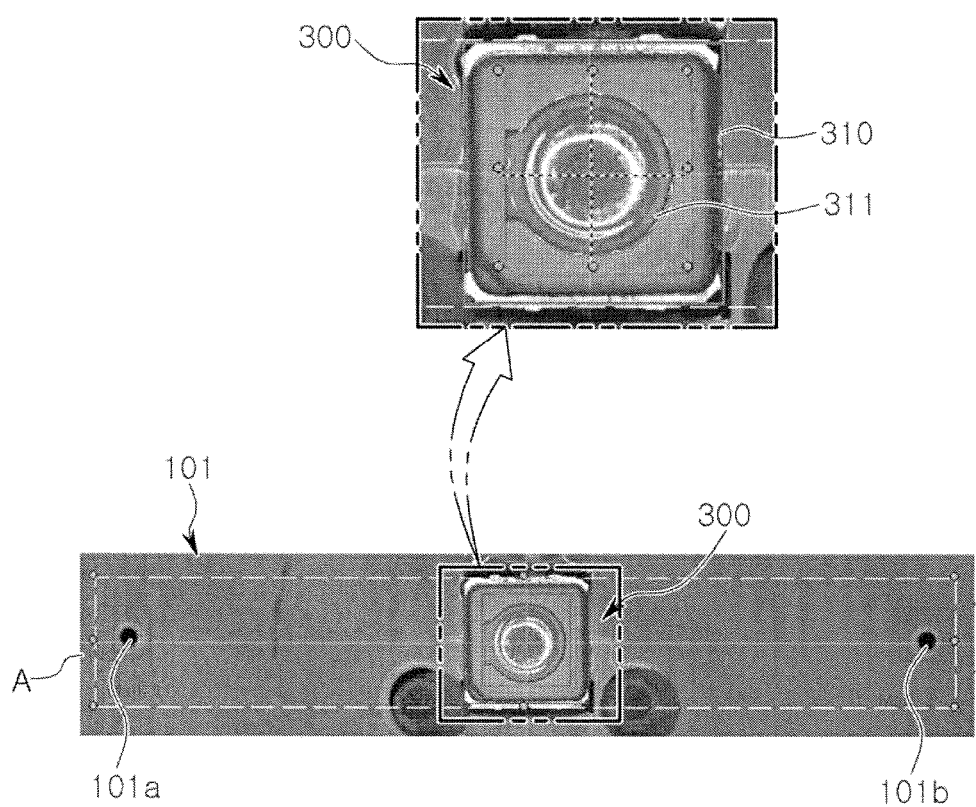
FIG. 9 is a photograph showing an image obtained by imaging portion "A" of FIG. 8.
Figure 10:
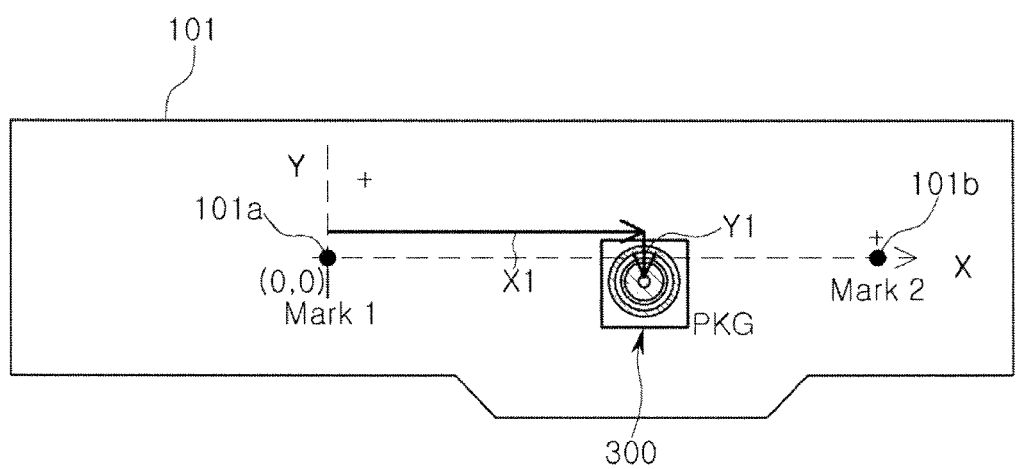
FIG. 10 is a view schematically illustrating a method for obtaining central coordinates of a light emitting device from the image of FIG. 9.

FIGS. 8 through 10 schematically illustrate a method of determining central coordinates of light emitting devices. This will be described briefly as follows.

As illustrated in FIG. 8, the imager 30 moves above the arranged boards 101 to capture images of each of the light emitting devices 300. As the imager 30, for example, a camera may be used, but the present disclosure is not limited thereto. Any device may be used as long as it can image an object to obtain an image thereof. Images of the light emitting devices 300 obtained through the imager 30 are delivered to the controller 40.

The controller 40 recognizes fiducial markers 101*a* and 101*b* formed on the board 101 and a position of each of the light emitting devices 300 from the obtained image as illustrated in FIGS. 9 and 10. The controller 40 then determines central coordinates of each of the light emitting devices 300 based on identifying the edges of the reflective cup 311 of each of the light emitting devices 300 in the obtained image. Here, the recognized central coordinates of each of the light emitting devices 300 are image coordinates.

Thereafter, the controller 40 converts the image coordinates with respect to the center of each of the light emitting devices 300 into actual coordinates to obtain physical central coordinates of each of the light emitting devices 300. Here, points serving as references of the actual coordinates may be the fiducial markers 101*a* and 101*b*. Thus, the central coordinates of each of the light emitting devices 300 may be defined as actual coordinates based on the fiducial markers.

FIG. 10 schematically illustrates a method of obtaining central coordinates of a light emitting device by converting image coordinates into actual coordinates. As illustrated in FIG. 10, the controller 40 sets the fiducial mark 101*a* recognized together with the light emitting device 300 as the origin of a virtual two-dimensional (2D) coordinate system. The controller 40 then calculates positions of image coordinates with respect to the origin, namely by calculating an X-axis distance and a Y-axis distance from the origin, respectively, to obtain coordinate values (X1 and Y1) serving as actual coordinates. An X-axis of the virtual two-dimensional (2D) coordinate system may be an axis passing through fiducial marks 101*a* and 101*b*, and a Y-axis may be perpendicular to the X-axis in a plane of the surface of the board 101.

The determined central coordinates (actual coordinate values) of each of the light emitting devices 300 may be used to attach the lens 200 as described hereinafter.

Meanwhile, in addition to the determining of the central coordinates of each of the light emitting devices 300, whether each of the light emitting devices 300 is defective may be determined through AOI. Defects of the light emitting devices 300 may include, for example, a defect due to contamination by a foreign object, a defect of a mounting position, and the like.

When a defective light emitting device 300 is detected through AOI, a process of replacing the corresponding defective light emitting device 300 with a good product may be performed. In addition, a board 101 on which a defective light emitting device has been replaced with a good light emitting device 300 or the good light emitting device 300 is mounted newly may be regrouped or remounted on the carrier 11.

Figure 11A:
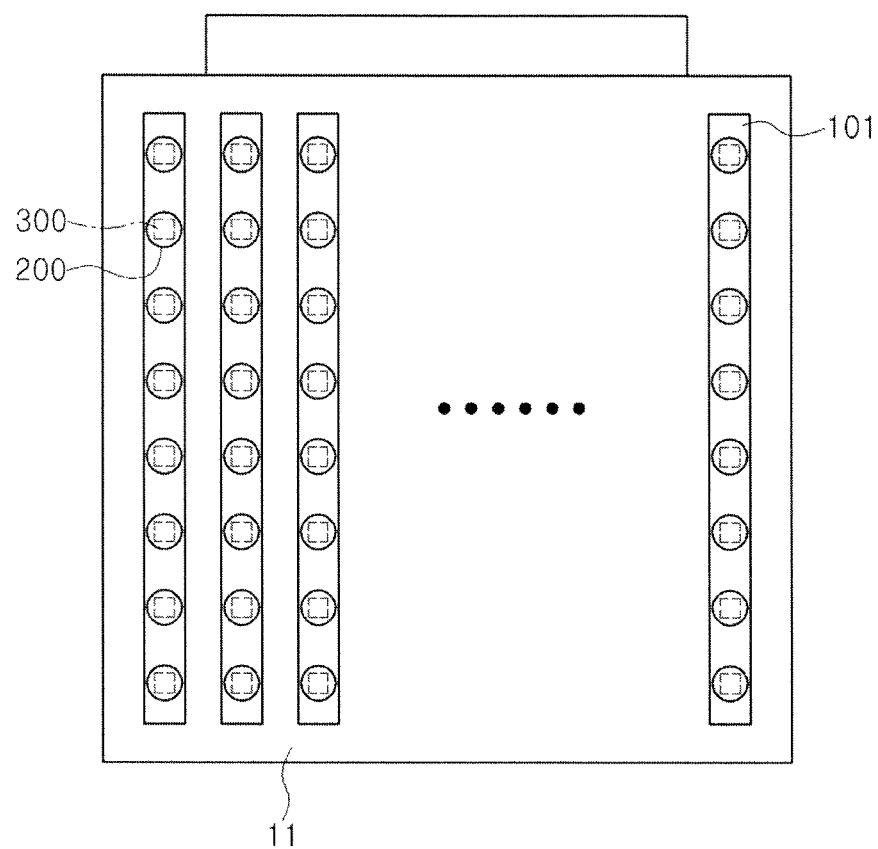
FIGS. 11A and 11B are a plan view and a cross-sectional view schematically illustrating a step of installing a plurality of lenses to cover the plurality of light emitting devices illustrated in FIG. 7.
Figure 11B:
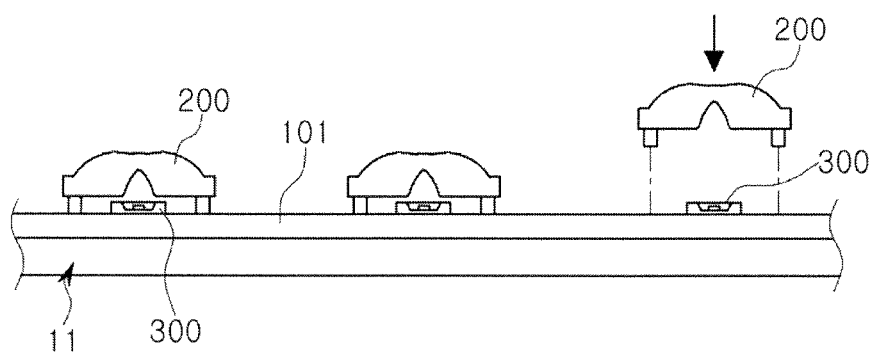

Thereafter, as illustrated in FIGS. 11A and 11B, the lens 200 is installed on each of the light emitting devices 300 (operation S320 of FIG. 5). The lens 200 may be disposed on each of the light emitting devices 300 based on the central coordinates of each of the light emitting devices 300 determined through AOI.

The lens 200 may be assembled through a reflow treatment in which the lens 200 is attached to the board 101 or the light emitting device 300 through an adhesive and heat-cured. In the present example embodiment, it is illustrated that the lens 200 is attached to the board 101, but the present disclosure is not limited thereto and the lens 200 may be attached to each of the light emitting devices 300 according to an example embodiment. Also, the lens 200 may be attached according to a method other than the heat curing method according to an example embodiment.

The lens 200 may be mounted such that it covers each of the light emitting devices 300. The lens 200 may be formed of a material having translucency or transparency allowing light emitted by each of the light emitting devices 300 to be radiated outwardly through the lens 200. For example, the material of the lens 200 may include polycarbonate (PC) or polymethylmetacrylate (PMMA), for example. Also, the lens 200 may be formed of a glass material, but the present disclosure is not limited thereto.

In order to adjust a beam angle of light radiated outwardly through the lens 200, the lens 200 may include a light dispersion material. The light dispersion material may include a material including one or more selected from the group consisting of $SiO_2$, $TiO_2$, and $Al_2O_3$, for example. Such a light dispersion material may be contained in the lens 200 within a range from about 3% to 15%. If the light dispersion material is contained in the amount of less than 3%, light may not be sufficiently dispersed, so a light dispersion effect cannot be expected. If the light dispersion material is contained in the amount of more than 15%, an amount of light emitted outwardly through the lens 200 may be reduced and thereby degrade light extraction efficiency. Meanwhile, an uneven structure may be formed on the surface of the lens 200.

The light source module 100 manufactured by assembling the lenses 200 with the light emitting devices 300 undergo lens inspection as a final process. The lens inspection may be performed through the light source module inspecting apparatus 1 of FIG. 1 and may include the inspection of lens misalignment and/or the inspection of unsymmetrical light emission distribution as described above.

The method of performing a lens misalignment inspection on the light source module 100 will be described with reference to FIGS. 4 and 5 together with FIGS. 12 through 15.

Figure 12:
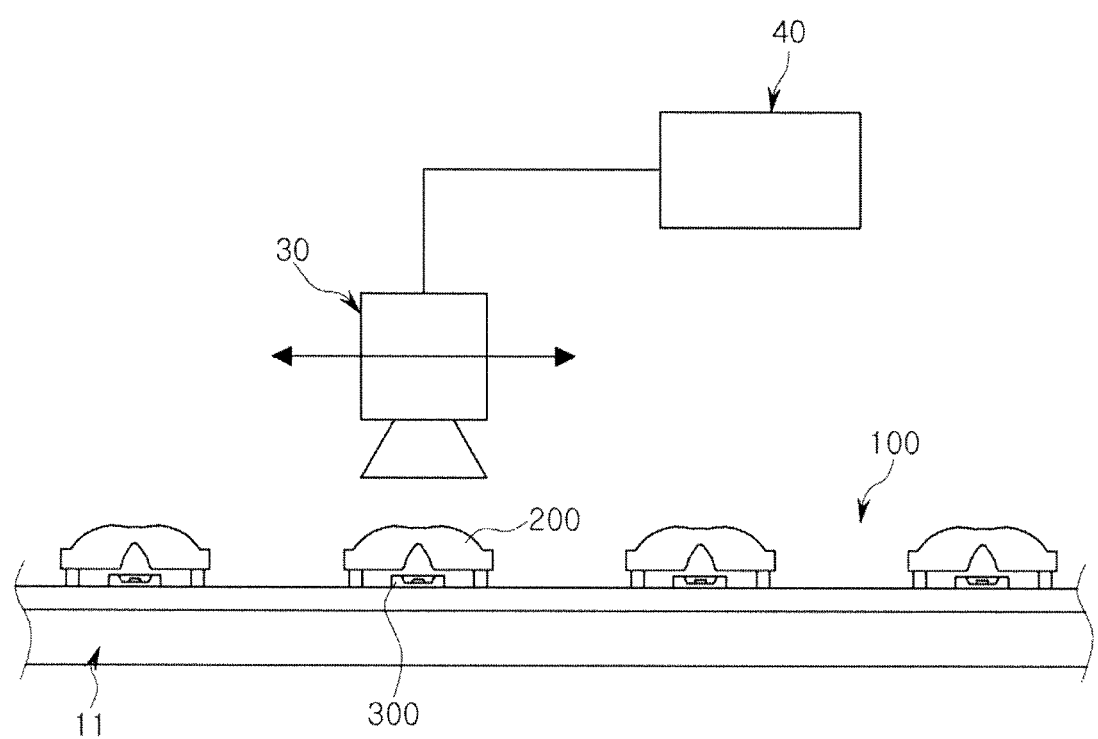
FIG. 12 is a cross-sectional view schematically illustrating a process for obtaining an image of a light source module such as one of those shown in FIGS. 11A and 11B.

As illustrated in FIG. 12, after the light source module 100 is manufactured by installing the light emitting devices 300 and the lenses 200 on the board 101, the light source module 100 may be disposed on the carrier 11 and a current is applied to turn the light emitting devices 300 of the light source module 100 on (operation S210 of FIG. 4 and S330 of FIG. 5).

When the light emitting devices 300 are turned on by applying a current, the imager 30 disposed above the carrier 11 may be moved to image each of the turned-on light emitting devices 300. The controller 40 connected to the imager 30 obtains captured images of the turned-on light emitting devices 300 and the lenses 200 respectively covering the light emitting devices 300 (operation S220 of FIG. 4 and S340 of FIG. 5).

Figure 13:
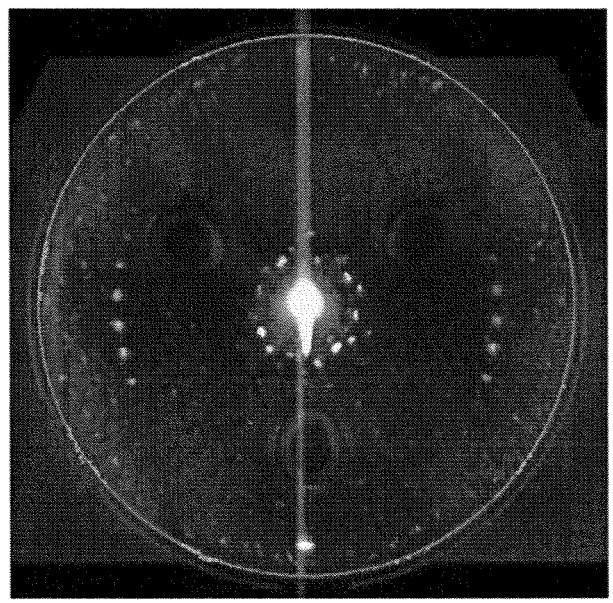
FIG. 13 is a photograph showing an image of a lens obtained by imaging the light source module illustrated in FIG. 12.

As illustrated in FIG. 13, the controller 40 recognizes a position of each of the lenses 200 from the image of each of the turned-on light emitting devices 300 obtained through the imager 30. The controller 40 then determines or reads central coordinates of each of the lenses 200 using the outer edges of each of the lenses 200. Here, the recognized central coordinates of the lenses are image coordinates.

Thereafter, the controller 40 converts the image coordinates with respect to the center of each of the lenses 200 into actual coordinates to obtain physical central coordinates of each of the lenses 200. Here, points used as references of the actual coordinates may be the fiducial markers 101a and 101b. Thus, like that of the light emitting devices 300, the central coordinates of each of the lenses 200 may be defined as actual coordinates based on the fiducial markers.

Figure 14:
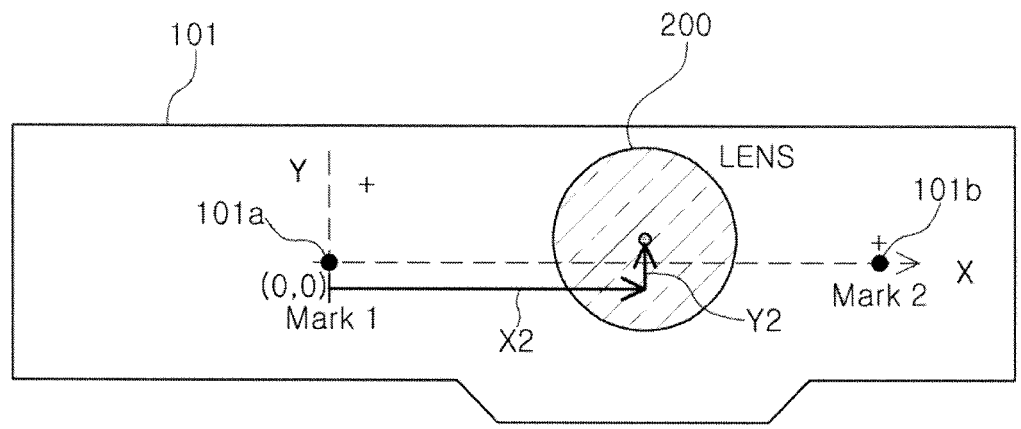
FIG. 14 is a view schematically illustrating a method for obtaining central coordinates of a lens such as that shown in FIG. 13.

FIG. 14 schematically illustrates a method of converting image coordinates of a lens into actual coordinates. As illustrated in FIG. 14, the controller 40 sets the fiducial mark 101a (Mark 1) recognized together with the lens 200 as the origin of a virtual two-dimensional (2D) coordinate system, and calculates positions of image coordinates with respect to the origin, namely, an X-axis distance and a Y-axis distance from the origin, respectively, to obtain coordinate values (X2 and Y2) serving as actual coordinates (operation S230 of FIG. 4 and S350 of FIG. 5).

Figure 15:
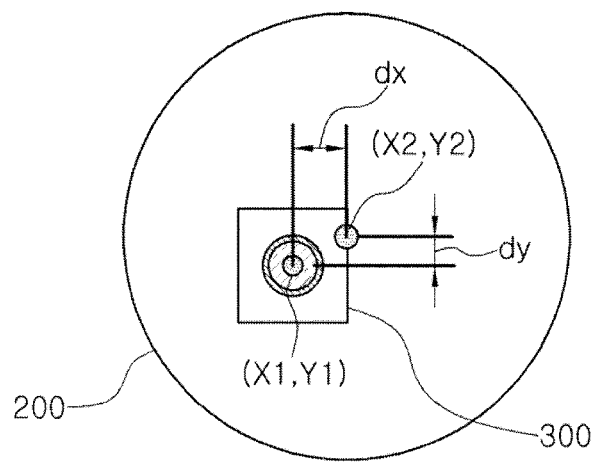
FIG. 15 is a view schematically illustrating a method of determining an offset value by comparing central coordinates of a lens and central coordinates of a light emitting device.

Thereafter, as illustrated in FIG. 15, the obtained central coordinates X2 and Y2 of the lens 200 are compared with the central coordinates X1 and Y1 of the light emitting device 300 previously determined through AOI to determine an offset value (operation S240 of FIG. 4 and S360 of FIG. 5). The offset value is then compared with a reference vale to determine whether there is an alignment defect (operation S250 of FIG. 4 and S370 of FIG. 5). For example, when the offset value is within an allowable error range, although the central coordinates of the lens 200 and those of the light emitting device 300 are not identical, the light emitting device may be determined as being good (or acceptable).

In a case in which the lens 200 is determined as having been shifted, the corresponding lens 200 may be removed and a new lens 200 may be transferred to be applied to the assembly process or the corresponding board may be discarded. Meanwhile, when the light source is determined to be good, that is the lens 200 is determined as not having been shifted, a packing process may be performed for being released as a product or the light source module may be transferred so as to be applied to a next process.

In the lens misalignment inspection according to the present example embodiment, the central coordinates of each of the light emitting devices 300 and the central coordinates of each of the lenses 200 may be determined as actual coordinates, and thus, a physical offset value may be accurately calculated as a numerical value. Thus, compared to the related art inspection method in which whether central coordinates of a light emitting device and those of a lens are identical is simply determined, the lens misalignment inspection according to the present example embodiment may allow for accurate calculation of a physical offset value.

In the method of manufacturing a light source module according to the present example embodiment, inspection of lens misalignment may be performed as a final process, but the present disclosure is not limited thereto. For example, the inspection for determining an unsymmetrical light emission distribution may be finally performed, instead of the inspection of lens misalignment. Also, the inspection of lens misalignment and the inspection of unsymmetrical light emission distribution may be performed together.

A method of performing inspection of unsymmetrical light emission distribution of the light source module 100 is will be described with reference to FIGS. 16A-16D and 17 through 19 together with FIG. 3.

First, as illustrated in FIG. 12, after the light source module 100 is manufactured by installing the light emitting devices 300 and the lenses 200 on the board 101, the light source module 100 may be disposed on the carrier 11 and a current is applied to turn the light emitting devices 300 of the light source module 100 on (operation S110 of FIG. 3).

When the light emitting devices 300 are turned on by applying a current, the imager 30 disposed above the carrier 11 may be moved to image each of the turned-on light emitting devices 300. The controller 40 connected to the imager 30 obtains captured images of the turned-on light emitting devices 300 and the lenses 200 respectively covering the light emitting devices 300 (operation S120 of FIG. 3).

Here, the obtained image may include a raw image captured through the imager 30 and a processed image obtained by processing the raw image. Namely, the raw image and the processed image may be stored as data in the controller 40.

The controller 40 calculates central symmetry denoting symmetry of light emission distribution from the center of each of the lenses 200, based on the image of the turned-on light emitting devices and the lenses 200, for example, the processed image (operation S130 of FIG. 3). The controller 40 compares the calculated central symmetry with a reference value to determine whether unsymmetrical light emission distribution has occurred (operation S140 of FIG. 3). Here, the determination of a defect may include a determination of a type of a defect, if any, as well as a determination of the presence and absence of a defect.

Figure 16A:
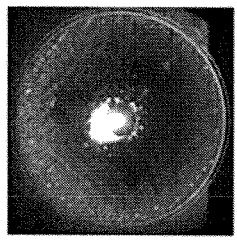
FIGS. 16A through 16D are photographs illustrating a method of calculating central symmetry of obtained images in stages.
Figure 16B:
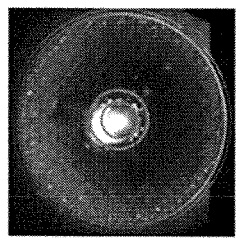
Figure 16C:
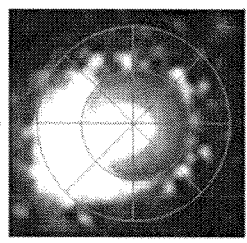
Figure 16D:
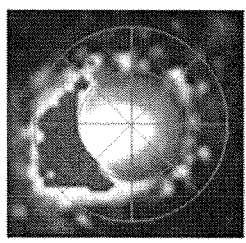

FIGS. 16A through 16D are photographs illustrating a method of determining central symmetry of obtained images in stages. When the raw image is processed to obtain a processed image as illustrated in FIG. 16A, an inspection region may be set in the processed image as illustrated in FIG. 16B. As for the inspection region, for example, circular edges of the lens 200 are recognized in the processed image, a central point of the lens 200 is recognized based on the recognized circular edges, and a region at a predetermined distance from the central point is then set as an inspection region. The set inspection region may be divided into a plurality of regions as illustrated in FIG. 16C. In detail, the inspection region may be first divided into a plurality of tracks depending on distances from the central points, and the plurality of tracks may be secondly divided radially. With the inspection region divided into a plurality of regions, central symmetry may be calculated based on luminance (or brightness) of each of the divided regions as illustrated in FIG. 16D.

Figure 17:
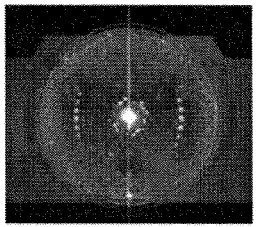
FIGS. 17 through 19 are sets of photographs illustrating comparisons between images of light emitting devices determined to be acceptable (good) and images of light emitting devices determined to be defective after the images were obtained by imaging turned-on light emitting devices.
Figure 17:
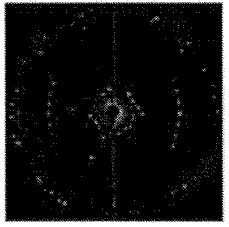
Figure 17:
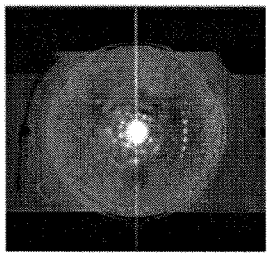
Figure 17:
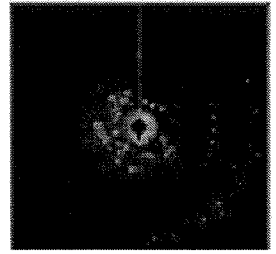
Figure 17:
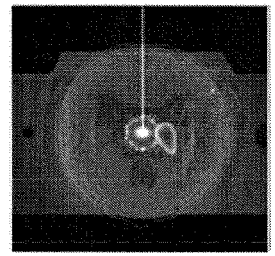
Figure 17:
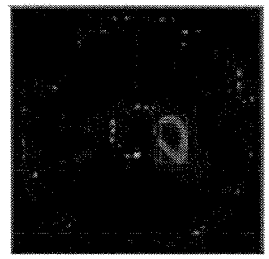
Figure 17:
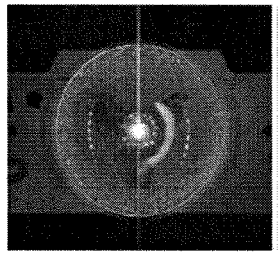
Figure 17:
Figure 17:
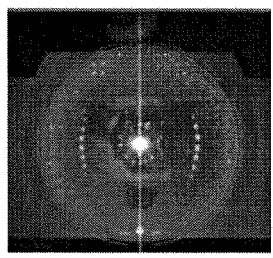
Figure 17:
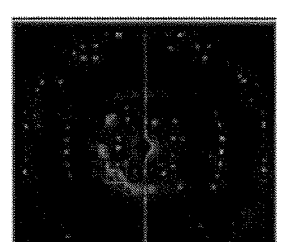
Figure 18:
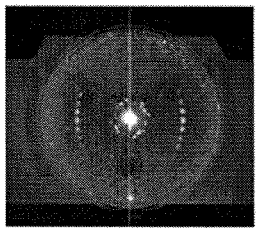
Figure 19:
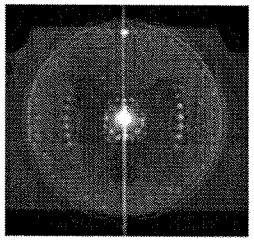
Figure 19:
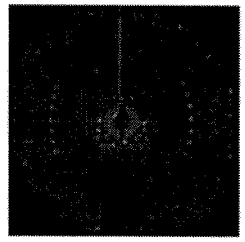
Figure 19:
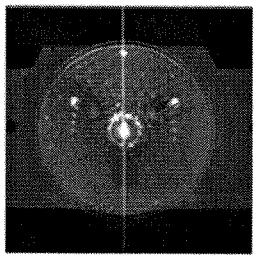
Figure 19:
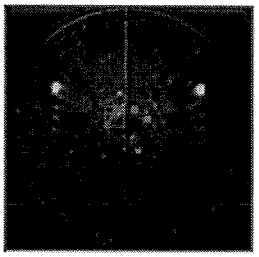
Figure 19:
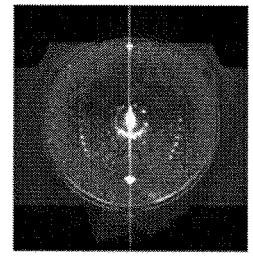
Figure 19:

FIGS. 17 through 19 are photographs illustrating comparisons between images of light emitting devices determined to be acceptable (good) and images of light emitting devices determined to be defective after the images were obtained by imaging turned-on light emitting devices. In FIGS. 17 through 19, raw images and processed images in case of acceptable (good) products and raw images and processed images in case of defective products are illustrated, respectively.

In FIG. 17, an image of a light emitting device that is defective due to presence or generation of a foreign object defect is compared with an image of an acceptable light emitting device. The foreign object defect may be caused when a lens itself has a problem, regardless of lens assembly process. For example, it may be a case in which a foreign object is included during a process of manufacturing a lens and the manufactured defective lens is used.

As illustrated in FIG. 17, it can be seen that, the raw image and the processed image of the acceptable product have a good symmetry overall, while in case of generation of a foreign object defect, symmetry of light tends to be broken at a central portion due to a foreign object.

In FIG. 18, an image of a light emitting device that is defective due to the occurrence of a process defect is compared with an image of an acceptable light emitting device. The process defect may result in a lens becoming defective during a heat-curing treatment for lens attachment during a lens assembly process, for example. The process defect may be caused as a lens is thermally deformed (for example, being melted) upon being heated at a temperature higher than a pre-set temperature level, or due to heat curing performed for a long period of time exceeding a pre-set period of time.

As illustrated in FIG. 18, it can be seen that, the raw image and the processed image of the acceptable product have a good symmetry overall, while in case of generation of a process defect, symmetry of light tends to be broken at the edge portion of the lens.

FIG. 19 illustrates comparisons between an image of a light emitting device that is defective due to a tilt defect compared with an image of an acceptable device. The tilt defect may be caused as a lens tilts, without leveling off, to be assembled during a lens attachment process.

As illustrated in FIG. 19, it can be seen that, the image of the acceptable product has a good symmetry overall, while in case of generation of a tilt defect, light tends to be distributed so as to be concentrated in one region of the lens.

The controller 40 may sort according to types of unsymmetrical light emission distribution and may display whether a defect has occurred and what kind of defect has occurred, or the like, for recognition of an operator through a display unit. Thus, the operator may recognize a defective light emitting device 300 among the plurality of light source modules 100 and also recognize even a type of the defect. Also, the operator may take appropriate measures depending on the type of the defect. For example, in a case in which a foreign object defect has occurred, the operator may stop the lens assembly process, replace a defective lens with a good lens, and continue to perform the lens assembly process. Also, in a case in which a process defect occurs, the operator may take measures of appropriately resetting a heating temperature, time, or the like, during a heat-curing process. Thus, reliability of a product can be enhanced and loss caused due to defective products being discarded in their entirety can be prevented.

The inspection of unsymmetrical light emission distribution is performed based on a principle that optical features appearing when a current is applied to turn the light emitting device on are varied depending on an assembly state or the characteristics of the lens itself. Thus, unlike the conventional inspection method allowing for determining only the presence and absence of a defect through a captured image, the inspection of unsymmetrical light emission distribution according to the present example embodiment is advantageous in that a type of a defect, as well as the presence and absence of a defect, may also be identified. Also, since appropriate corrective measures may be taken according to the identified type of defect, generation of additional defects can be prevented.

Meanwhile, in the method of manufacturing a light source module according to the present example embodiment, it is illustrated that any one of inspection of lens misalignment and the inspection of unsymmetrical light emission distribution is performed as a final process, but the embodiment in the present disclosure is not limited thereto. For example, the inspection of lens misalignment and the inspection of unsymmetrical light emission distribution may be performed together. In this case, determination of lens misalignment and determination of unsymmetrical light emission distribution may be performed based on the same image. Namely, a process of obtaining an image through the imager is performed only once and lens misalignment and unsymmetrical light emission distribution may be determined using the obtained image.

In this manner, by performing inspection whether a product is defective at a final stage of the manufacturing process, a defective product can be prevented from being applied to a next process or from being delivered to a consumer. Thus, additional problems, for example, damage to a product, a resultant degradation of reliability of a product, a degradation of an image, and the like, can be prevented.

In addition, through an in-line system of processing from a stage of mounting light emitting devices on a board to a stage of inspecting a defect, as continuous processing, a manufacturing process of the light source module 100 can be monitored and information for maintaining precision of a product can be provided. In particular, in the inspection method according to the present example embodiment, the light source modules 100 are arranged as a multi-array, allowing for high speed and total inspection, and thus, productivity can be enhanced.

Figure 20:
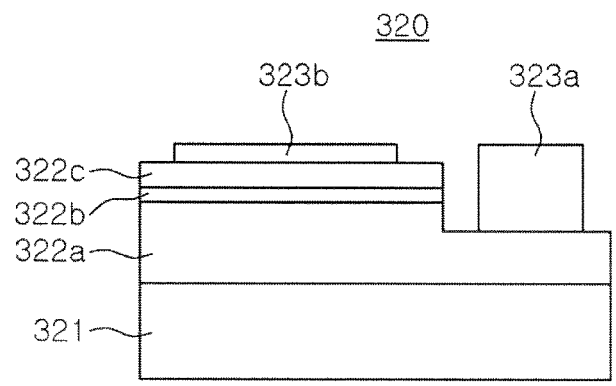
FIGS. 20 through 22 are cross-sectional views illustrating various examples of light emitting diode chips that may be employed in a light source module according to an example embodiment in the present disclosure.
Figure 21:
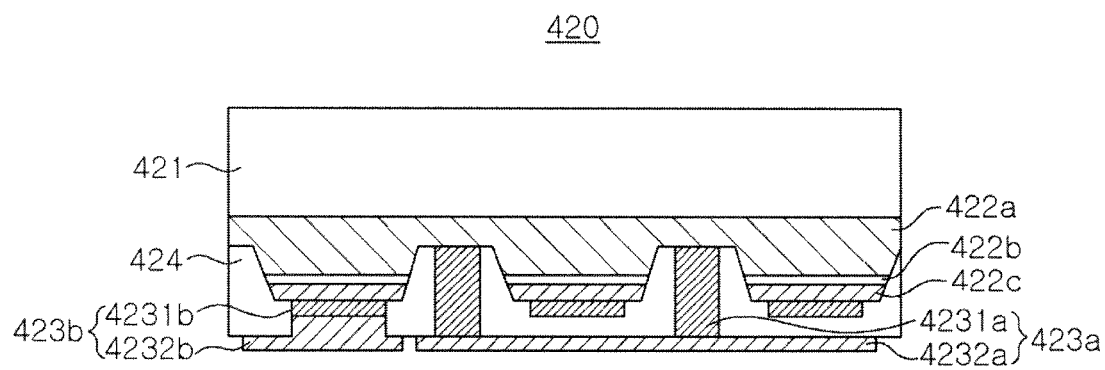
Figure 22:
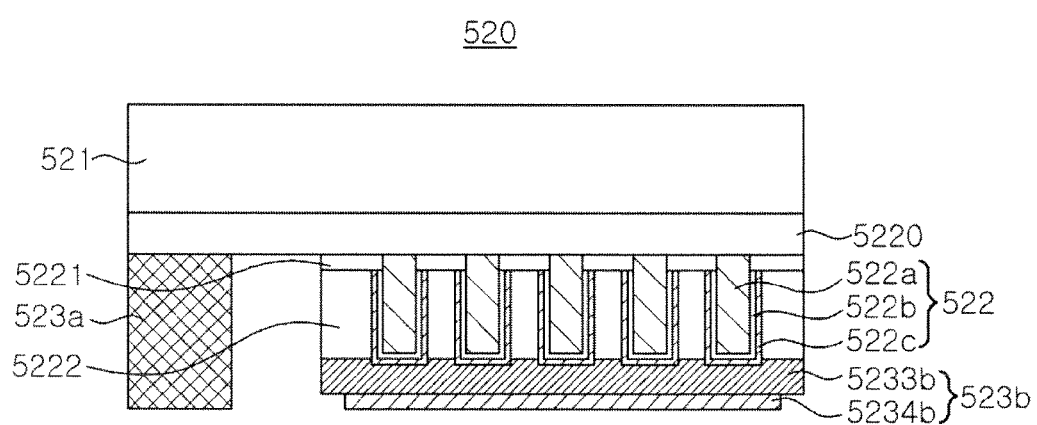

FIGS. 20 through 22 schematically illustrate various examples of light emitting diode (LED) chips employable in a light source module according to an example embodiment in the present disclosure.

Referring to FIG. 20, a light emitting device 320 may include a first conductivity-type semiconductor layer 322a, an active layer 322b, and a second conductivity-type semiconductor layer 322c sequentially stacked on a growth substrate 321.

The first conductivity-type semiconductor layer 322a stacked on the growth substrate 321 may be an n-type nitride semiconductor layer doped with an n-type impurity. The second conductivity-type semiconductor layer 322c may be a p-type nitride semiconductor layer doped with a p-type impurity. However, positions of the first and second conductivity-type semiconductor layers 322a and 322c may be interchanged so as to be stacked. The first and second conductivity-type semiconductor layers 322a and 322c may have an empirical formula $Al_xIn_yGa_{(1-x-y)}N$ (here, $0 \le x<1$, $0 \le y<1$, $0 \le x+y<1$), and, for example, materials such as GaN, AlGaN, InGaN, AlInGaN may correspond thereto.

The active layer 322b disposed between the first and second conductivity-type semiconductor layers 322a and 322c may emit light having a predetermined level of energy through electron-hole recombination. The active layer 322b may include a material having an energy band gap smaller than those of the first and second conductivity-type semiconductor layers 322a and 322c. For example, in a case in which the first and second conductivity-type semiconductor layers 322a and 322c are formed of a GaN-based compound semiconductor, the active layer 322b may include an InGaN-based compound semiconductor having an energy band gap smaller than that of GaN. Also, the active layer 322b may have a multi-quantum well (MQW) structure in which quantum barrier layers and quantum well layers are alternately stacked. For example, the active layer 322b may have a multi-quantum well (MQW) structure in which quantum well layers and quantum barrier layers are alternately stacked, for example, an InGaN/GaN structure. However, embodiment in the present disclosure is not limited thereto and the active layer 322b may have a single quantum well (SQW) structure.

The LED chip 320 may include first and second electrode pads 323a and 323b electrically connected to the first and second conductivity-type semiconductor layers 322a and 322c, respectively. The first and second electrode pads 323a and 323b may be disposed and exposed to face in the same direction. The first and second electrode pads 323a and 323b may be electrically connected to a board through wire bonding or flipchip bonding.

An LED chip 420 illustrated in FIG. 21 includes a semiconductor stacked body formed on a growth substrate 421. The semiconductor stacked body may include a first conductivity-type semiconductor layer 422a, an active layer 422b, and a second conductivity-type semiconductor layer 422c.

The LED chip 420 may include first and second electrode pads 423a and 423b respectively connected to the first and second conductivity-type semiconductor layers 422a and 422b. The first electrode pad 423a may include a conductive via 4231a connected to the first conductivity-type semiconductor layer 422a through the second conductivity-type semiconductor layer 422c and the active layer 422b and an electrode extending portion 4232a connected to the conductive via 4231a. The conductive via 4231a may be surrounded by an insulating layer 424 so as to be electrically separated from the active layer 422b and the second conductivity-type semiconductor layer 422c. The conductive via 4231a may be disposed in a region formed by etching the semiconductor stacked body. The amount, shape, and pitch of conductive vias 4231a, a contact area with respect to the first conductivity-type semiconductor layer 422a, and the like, may be appropriately designed such that contact resistance is reduced. The conductive vias 4231a may be arranged in rows and columns on the semiconductor stacked body, improving a current flow. The second electrode pad 423b may include an ohmic contact layer 4231b and an electrode extending portion 4232b on the second conductivity-type semiconductor layer 422c.

A light emitting device 520 illustrated in FIG. 22 includes a growth substrate 521, a first conductivity-type semiconductor base layer 5220 formed on the growth substrate 521, and a plurality of light emitting nanostructures 522 formed on the first conductivity-type semiconductor base layer 5220. The light emitting device 520 may further include an insulating layer 5221 and a filler portion 5222.

Each of the plurality of light emitting nanostructures 522 includes a first conductivity-type semiconductor core 522a, and an active layer 522b and a second conductivity-type semiconductor layer 522c sequentially formed as shell layers on the surface of the first conductivity-type semiconductor core 522a.

In the present example embodiment, it is illustrated that each of the light emitting nanostructures 522 has a core-shell structure, but embodiment in the present disclosure is not limited thereto and each of the light emitting nanostructures 522 may have any other structure such as a pyramid structure. The first conductivity-type semiconductor base layer 5220 may be a layer providing a growth surface for the light emitting nanostructures 522. The insulating layer 5221 may provide an open region allowing the light emitting nanostructures 522 to be grown, and may be formed of a dielectric material such as $SiO_2$ or $SiN_x$. The filler portion 5222 may structurally stabilize the light emitting nanostructures 522 and allows light to be transmitted or reflected. Alternatively, in a case in which the filler portion 5222 includes a light-transmissive material, the filler portion 5222 may be formed of a transparent material such as $SiO_2$, SiNx, an elastic resin, silicon, an epoxy resin, a polymer, or plastic. If necessary, in a case in which the filler portion 5222 includes a reflective material, the filler portion 5222 may be formed of metal powder or ceramic powder having high reflectivity mixed with a polymer material such as polyphtalamide (PPA), or the like, as needed. The highly reflective ceramic powder may be at least one selected from the group consisting of $TiO_2$, $Al_2O_3$, $Nb_2O_5$, $Al_2O_3$, and ZnO. Alternatively, a highly reflective metal such as aluminum (Al) or silver (Ag) may be used.

The first and second electrode pads 523a and 523b may be disposed on lower surfaces of the light emitting nanostructures 522. The first electrode pad 523a is positioned on an exposed upper surface of the first conductivity-type semiconductor base layer 5220, and the second electrode pad 523b includes an ohmic contact layer 5233b and an electrode extending portion 5234b formed below the light emitting nanostructures 522 and the filler portion 5222. Alternatively, the ohmic contact layer 5233b and the electrode extending portion 5234b may be integrally formed.

The resin 312 encapsulating the LED chip 320 may include a wavelength conversion material to convert a wavelength of light irradiated outwardly through the resin 312. For example, at least one or more types of phosphor emitting light having a different wavelength upon being excited by light generated by the plurality of LED chips 320 may be contained as a wavelength conversion material. Accordingly, light having various colors including white light may be adjusted to be emitted.

For example, when the LED chip 320 emits blue light, it may be combined with yellow, green, red, and orange phosphors to emit white light. Also, it may include at least one of light emitting devices that emit purple, blue, green, red, and infrared light. In this case, the LED chip 320 may control a color rendering index (CRI) to range from a sodium-vapor (Na) lamp (40) to a sunlight level (100), or the like, and control a color temperature ranging from 2000K to 20000K to generate various levels of white light. If necessary, the LED chip 320 may generate visible light having purple, blue, green, red, orange colors, or infrared light to adjust an illumination color according to a surrounding atmosphere or mood. Also, the LED chip 320 may generate light having a special wavelength stimulating plant growth.

Figure 23:
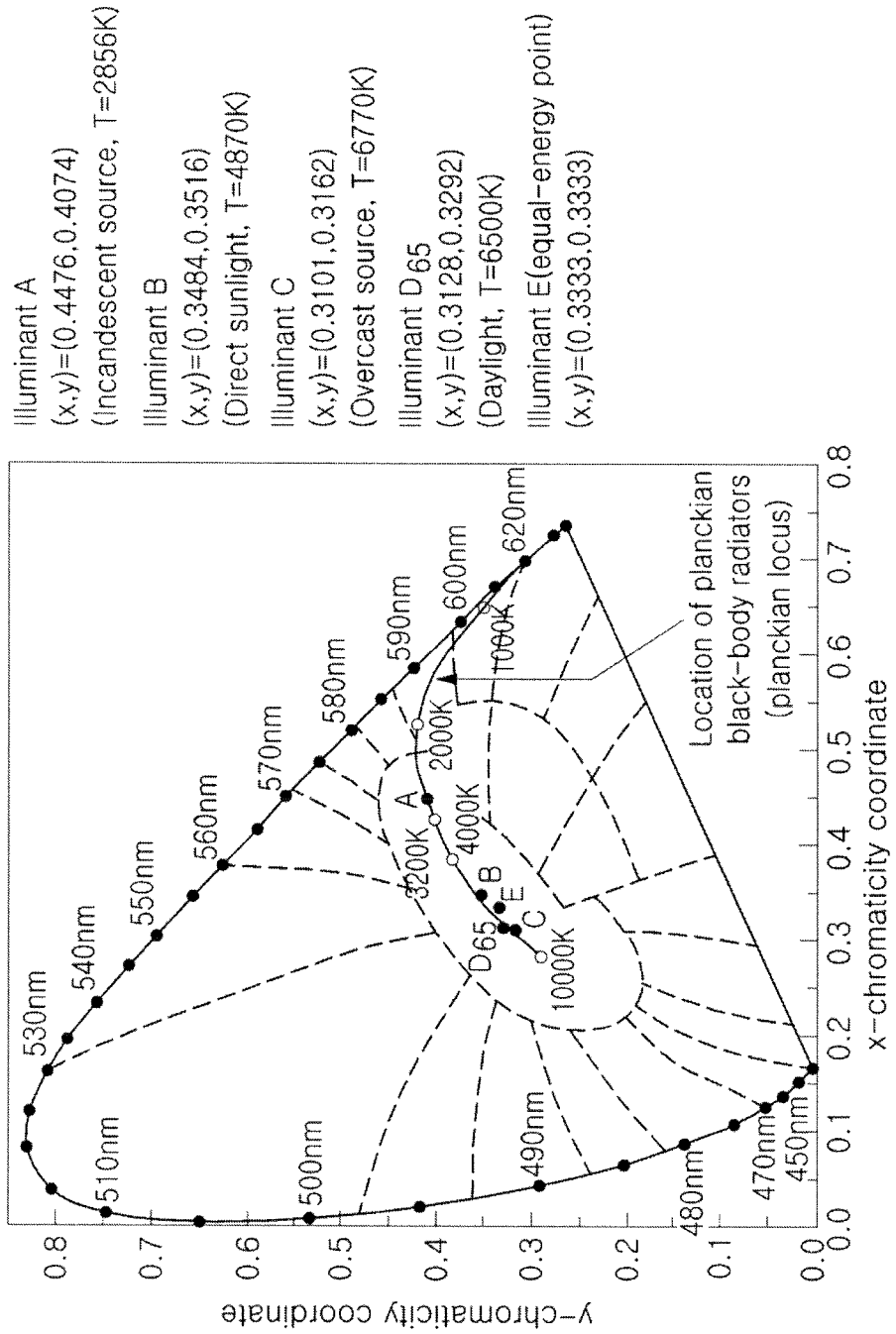
FIG. 23 is a CIE 1931 color space chromaticity diagram.

White light generated by combining yellow, green, red phosphors to a blue LED and/or combining at least one of a green LED and a red LED thereto may have two or more peak wavelengths and may be positioned in a segment linking (x, y) coordinates (0.4476, 0.4074), (0.3484, 0.3516), (0.3101, 0.3162), (0.3128, 0.3292), (0.3333, 0.3333) of a CIE 1931 chromaticity diagram illustrated in FIG. 23. Alternatively, white light may be positioned in a region surrounded by a spectrum of black body radiation and the segment. A color temperature of white light corresponds to a range from about 2000K to about 20000K.

Phosphors may have the following empirical formulas and colors:

Oxides: Yellow and green $Y_3Al_5O_{12}$:Ce, $Tb_3Al_5O_{12}$:Ce, $Lu_3Al_5O_{12}$:Ce Silicates: Yellow and green $(Ba,Sr)_2SiO_4$:Eu, yellow and orange $(Ba,Sr)_3SiO_5$:Ce Nitrides: Green β-SiAlON:Eu, yellow $La_3Si_6N_{11}$:Ce, orange α-SiAlON:Eu, red $CaAlSiN^3$:Eu, $Sr_2Si_5N_8$:Eu, $SrSiAl_4N_7$:Eu Fluorides: KSF-based red $K_2SiF_6$:Mn4+

Phosphor compositions should basically conform with Stoichiometry, and respective elements may be substituted with different elements of respective groups of the periodic table. For example, strontium (Sr) may be substituted with barium (Ba), calcium (Ca), magnesium (Mg), or the like, of alkali earths, and yttrium (Y) may be substituted with terbium (Tb), Lutetium (Lu), scandium (Sc), gadolinium (Gd), or the like. Also, europium (Eu), an activator, may be substituted with cerium (Ce), terbium (Tb), praseodymium (Pr), erbium (Er), ytterbium (Yb), or the like, according to a desired energy level, and an activator may be applied alone, or a coactivator, or the like, may be additionally applied to change characteristics.

Also, materials such as quantum dots, or the like, may be applied as materials that replace phosphors, and phosphors and quantum dots may be used in combination or alone in an LED.

A quantum dot may have a structure including a core (3 nm to 10 nm) such as CdSe, InP, or the like, a shell (0.5 nm to 2 nm) such as ZnS, ZnSe, or the like, and a ligand for stabilizing the core and the shell, and may implement various colors according to sizes.

Table 1 below illustrates types of phosphors in applications fields of white light emitting devices using a blue LED (wavelength: 440 nm to 460 nm).

TABLE 1

| Purpose | Phosphor |
| --- | --- |
| LED TV BLU | β-SiAlON:$Eu^{2+}$ |
| | (Ca, Sr)AlSiN$_3$:$Eu^{2+}$ |
| | $La_3Si_6N_{11}$:$Ce^{3+}$ |
| | $K_2SiF_6$:$Mn^{4+}$ |
| Lighting device | $Lu_3Al_5O_{12}$:$Ce^{3+}$ |
| | Ca-α-SiAlON:$Eu^{2+}$ |
| | $La_3Si_6N_{11}$:$Ce^{3+}$ |
| | (Ca, Sr)AlSiN$_3$:$Eu^{2+}$ |
| | $Y_3Al_5O_{12}$:$Ce^{3+}$ |
| | $K_2SiF_6$:$Mn^{4+}$ |
| Side Viewing (Mobile, Notebook PC) | $Lu_3Al_5O_{12}$:$Ce^{3+}$ |
| | Ca-α-SiAlON:$Eu^{2+}$ |
| | $La_3Si_6N_{11}$:$Ce^{3+}$ |
| | (Ca, Sr) AlSiN$_3$:$Eu^{2+}$ |
| | $Y_3Al_5O_{12}$:$Ce^{3+}$ |
| | (Sr, Ba, Ca, Mg)$_2$SiO$_4$ |
| | $K_2SiF_6$:$Mn^{4+}$ |
| Electrical component | $Lu_3Al_5O_{12}$:$Ce^{3+}$ |
| | Ca-α-SiAlON:$Eu^{2+}$ |

TABLE 1-continued

| Purpose | Phosphor |
| --- | --- |
| (headlamp, etc ) | $La_3Si_6N_{11}$:$Ce^{3+}$ |
| | (Ca, Sr)AlSiN$_3$:$Eu^{2+}$ |
| | $Y_3Al_5O_{12}$:$Ce^{3+}$ |
| | $K_2SiF_6$:$Mn^{4+}$ |

Figure 24:
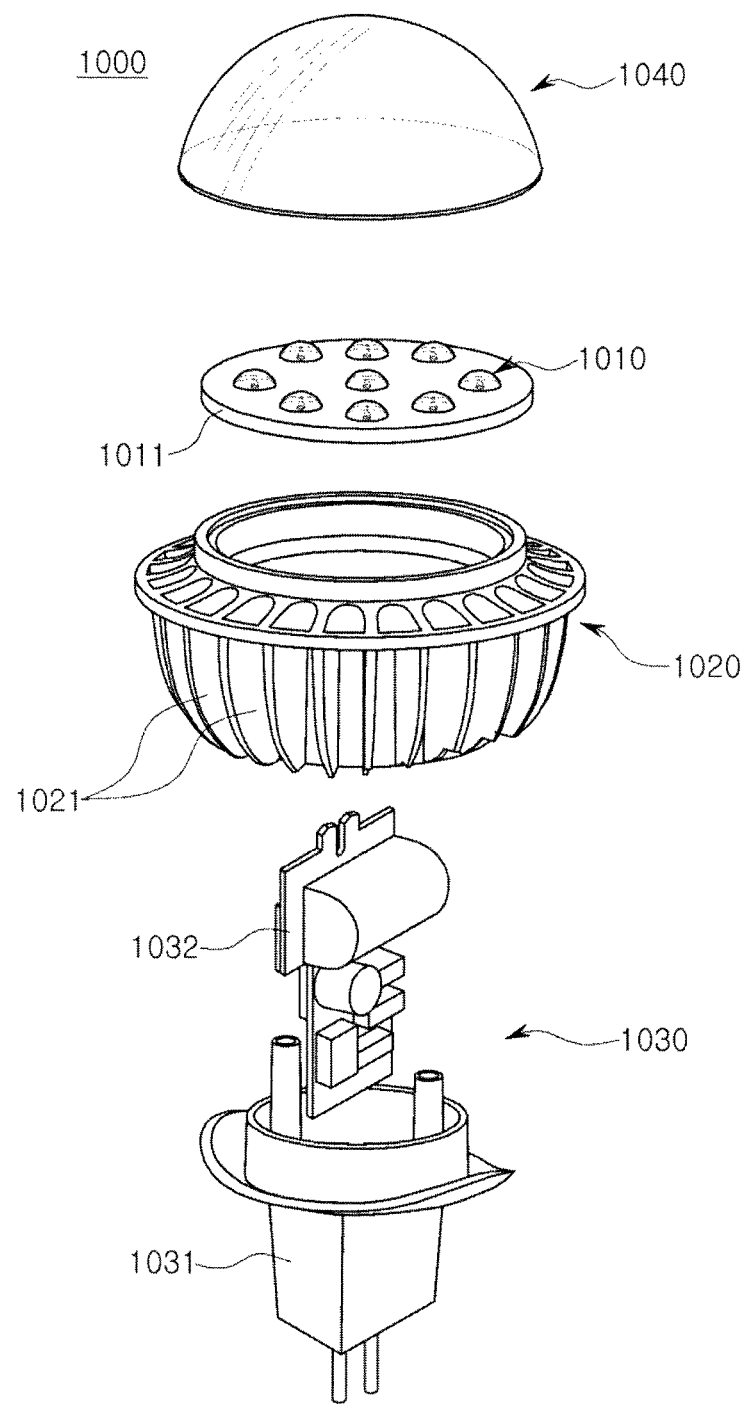
FIG. 24 is an exploded perspective view schematically illustrating a lighting device (bulb type) according to an example embodiment in the present disclosure.

FIG. 24 schematically illustrates a lighting device according to an example embodiment in the present disclosure.

Referring to FIG. 24, a lighting device 1000 according to an example embodiment in the present disclosure may be a bulb-type lamp and may be used as an indoor lighting device, for example, a downlight. The lighting device 1000 may include a housing 1020 having an electrical connection structure 1030 and at least one light source module 1010 mounted on the housing 1020. The lighting device 1000 may further include a cover 1040 covering the at least one light source module 1010.

The light source module 1010 may be substantially identical to the light source module illustrated in FIGS. 2A and 2B, except that a board 1011 has a circular shape, rather than the bar-like shape, and thus a detailed description thereof will be omitted.

The housing 1020 serves both as a frame supporting the light source module 1010 and as a heat sink outwardly dissipating heat generated by the light source module 1010. To this end, the housing 1020 may be formed of a material being substantial (rigid, sturdy, or solid) and having high heat conductivity. For example, the housing 1020 may be formed of a metal material such as aluminum (Al), or a heat dissipation resin.

A plurality of heat dissipation fins 1021 may be provided in an outer surface of the housing 1020 in order to increase a contact area with air to enhance heat dissipation efficiency.

The housing 1020 has the electrical connection structure 1030 electrically connected to the light source module 1010. The electrical connection structure 1030 may include a terminal unit 1031 and a driving unit 1032 supplying driving power supplied through the terminal unit 1031 to the light source module 1010.

The terminal unit 1031 serves to allow the lighting device 1000 to be fixedly installed in, for example, a socket, or the like, so as to be electrically connected. In the present example embodiment, the terminal unit 1031 is illustrated to have a slidably inserted pin-type structure, but the embodiment in the present disclosure is not limited thereto. If necessary, the terminal unit 1031 may have an Edison type structure having thread going around to be inserted.

The driving unit 1032 serves to convert external driving power into a current source appropriate for driving the light source module 1010, and provide the same. The driving unit 1032 may be configured as, for example, an AC-DC converter, a rectifying circuit component, a fuse, or the like. Also, the driving unit 1032 may further include a communications module implementing remote controlling according to circumstances.

The cover 1040 may be installed on the housing 1020 to cover the light source module 1010 and have a convex lens shape or a bulb shape. The cover 1040 may be formed of a light-transmissive material and contain a light dispersion material.

Figure 25:
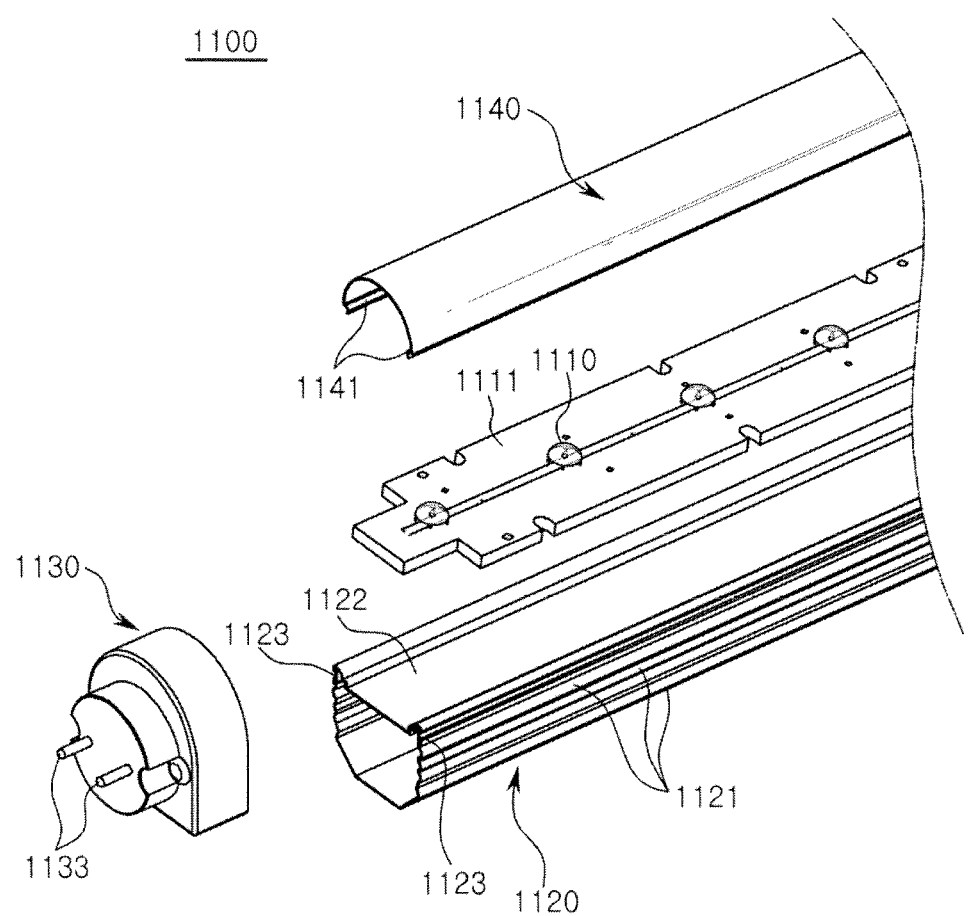
FIG. 25 is an exploded perspective view schematically illustrating a lighting device (lamp type) according to an example embodiment in the present disclosure.

FIG. 25 is an exploded perspective view schematically illustrating a lighting device (L-type lamp) according to an example embodiment in the present disclosure. Referring to FIG. 25, a lighting device 1100 may be, for example, a bar-type lamp and include a light source module 1110, a housing 1120, a terminal 1130, and a cover 1140.

As the light source module 1110, the light source module illustrated in FIGS. 2A and 2B may be employed. Thus, detailed descriptions thereof will be omitted.

The housing 1120 may allow the light source module 1110 to be fixedly mounted on one surface 1122 thereof and dissipate heat generated by the light source module 1110 outwardly. To this end, the housing 1120 may be formed of a material having excellent thermal conductivity, for example, metal, and a plurality of heat dissipation fins 1121 may protrude from both lateral surfaces of the housing 1120 to dissipate heat. The light source module 1110 may be mounted on one surface 1122 of the housing 1120.

The cover 1140 is fastened to stoppage grooves 1123 of the housing 1120 to cover the light source module 1110. The cover 1140 may have a semicircular curved surface to allow light generated by the light source module 1110 to be uniformly radiated to the outside overall. Protrusions 1141 may be formed in a longitudinal direction on a bottom surface of the cover 1140 and engaged with the stoppage grooves 1123 of the housing 1120.

The terminal 1130 may be provided on at least one open side, among both end portions of the housing 1120 in a longitudinal direction to supply power to the light source module 1110 and include electrode pins 1133 protruding outwardly.

Figure 26:
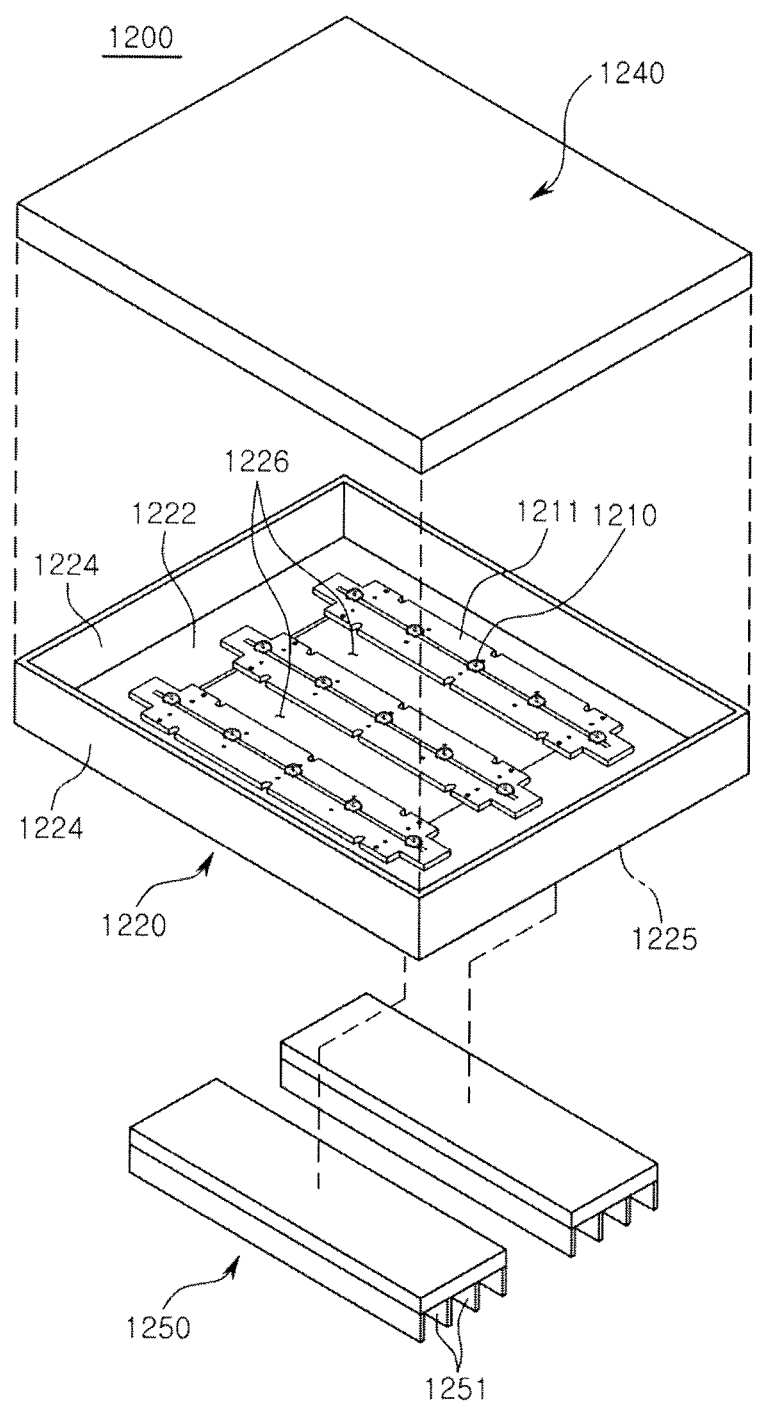
FIG. 26 is an exploded perspective view schematically illustrating a lighting device (flat plate type) according to an example embodiment in the present disclosure.

FIG. 26 schematically illustrates a (flat plate-type) lighting device according to an example embodiment in the present disclosure. Referring to FIG. 26, a lighting device 1200 may have, for example, a surface light source-type structure and may include a light source module 1210, a housing 1220, a cover 1240, and a heat sink 1250.

As the light source module 1210, the light source module illustrated in FIGS. 2A and 2B may be employed. A detailed description thereof will be omitted.

The housing 1220 may have a box-shaped structure including one internal surface 1222 on which the light source module 1210 is mounted and lateral surfaces 1224 extending from the circumference of the one surface 1222. The housing 1220 may be formed of a material having excellent thermal conductivity, for example, a metal, that may dissipate heat generated by the light source module 1210 outwardly.

One or more hole(s) 1226 to which the heat sink 1250 (to be described below) are insertedly fastened may be formed in the one surface 1222 of the housing 1220 to penetrate through the housing 1220. The light source module 1210 mounted on the one surface 1222 may partially span the one or more hole(s) 1226 so as to be exposed to the outside.

The cover 1240 may be fastened to the housing 1220. The cover 1240 may have an overall flat structure.

The heat sink 1250 may be fastened to the hole 1226 through the other (external) surface 1225 of the housing 1220 opposite to the internal surface 1222. The heat sink 1250 may be in contact with the light source module 1210 through the hole 1226 to dissipate heat from the light source module 1210 outwardly. In order to increase heat dissipation efficiency, the heat sink 1250 may have a plurality of heat dissipation fins 1251. The heat sink 1250 may be formed of a material having excellent thermal conductivity, like the housing 1220.

As described above, the lighting device using a light emitting device may be applied to an indoor lighting device or an outdoor lighting device according to the purpose thereof. The indoor LED lighting device may include a lamp, a fluorescent lamp (LED-tube), or a flat panel type lighting device replacing an existing lighting fixture (retrofit), and the outdoor LED lighting device may include a streetlight, a security light, a floodlight, a scene lamp, a traffic light, and the like.

Also, the lighting device using LEDs may be utilized as an internal or external light source of a vehicle. As an internal light source, the LED lighting device may be used as an indoor light, a reading light, or as various dashboard light sources of a vehicle. As an external light source, the LED lighting device may be used as a headlight, a brake light, a turn signal lamp, a fog light, a running light, and the like.

In addition, the LED lighting device may also be applicable as a light source used in robots or various mechanic facilities. LED lighting using light within a particular wavelength band may promote plant growth and stabilize a person's mood or treat diseases using emotional lighting.

The lighting device using a light emitting device may be altered in terms of an optical design thereof according to a product type, a location, and a purpose. For example, in relation to the foregoing emotional illumination, a technique for controlling lighting by using a wireless (remote) control technique utilizing a portable device such as a smartphone may be provided, in addition to a technique of controlling color, temperature, brightness, and hue of illumination In addition, a visible wireless communications technology aimed at simultaneously achieving a unique purpose of an LED light source and a purpose of a communications unit by adding a communications function to LED lighting devices and display devices may be available. This is because an LED light source has a longer lifespan and excellent power efficiency, implements various colors, supports a high switching rate for digital communications, and is available for digital control, in comparison with existing light sources.

The visible light wireless communications technology is a wireless communications technology transferring information wirelessly by using light having a visible light wavelength band recognizable by the naked eye. The visible light wireless communications technology is distinguished from a wired optical communications technology in that it uses light having a visible light wavelength band and that a communications environment is based on a wireless scheme.

Also, unlike RF wireless communications, the visible light wireless communications technology has excellent convenience and physical security properties as it can be freely used without being regulated or needing permission in the aspect of frequency usage, is differentiated in that a user can physically check a communications link, and above all, the visible light wireless communications technology has features as a convergence technology that obtains both a unique purpose as a light source and a communications function.

As set forth above, according to exemplary embodiments of the present disclosure, the method of inspecting a light source module for defects, the method of manufacturing a light source module, and an apparatus for inspecting a light source module and removing causes of a light uniformity defect such as mura during manufacturing of a light source module can be used to enhance reliability and productivity of a product.

Advantages and effects of the present disclosure are not limited to the foregoing content and may be easily understood from the described specific exemplary embodiments of the present disclosure.

While example embodiments have been shown and described above, it will be apparent to those skilled in the art that modifications and variations could be made without departing from the scope of the present disclosure as defined by the appended claims.

What is claimed is:

1. A method of inspecting a light source module for defects, the method comprising:
preparing a board having thereon a light emitting device and a lens covering the light emitting device;
applying a current to the light emitting device to turn on the light emitting device;
imaging the lens with the light emitting device turned on to obtain an image of the lens;
calculating central symmetry denoting a symmetry of light emission distribution from the center of the lens based on the obtained image;
comparing the calculated central symmetry with a reference value to determine whether unsymmetrical light emission distribution has occurred;
determining central coordinates of the light emitting device mounted on the board;
determining central coordinates of the lens from the obtained image of the lens;
comparing the central coordinates of the light emitting device and the central coordinates of the lens to calculate an offset value; and
comparing the offset value with a reference value to determine whether lens misalignment has occurred.

2. The method of claim 1, wherein the calculating of central symmetry comprises:
setting an inspection region in the obtained image;
dividing the inspection region into a plurality of sub-regions; and
calculating central symmetry based on luminance of each of the divided sub-regions.

3. The method of claim 2, wherein, in the setting of the inspection region, a region including areas located at a predetermined distance from a center of the lens is set as the inspection region.

4. The method of claim 2, wherein the dividing of the inspection region into the plurality of sub-regions comprises first dividing the inspection region into a plurality of tracks each including areas located within a predetermined range of distances from the center of the lens, and secondly dividing each of the plurality of tracks radially into the plurality of sub-regions.

5. The method of claim 1, wherein the current applied in the operation of turning on the light emitting device is a current equal to or more than 50% of a rated current for driving the light emitting device.

6. The method of claim 1, wherein the determining of central coordinates of the lens comprises:
recognizing fiducial markers formed on the board and the position of the lens from the obtained image;
determining the central coordinates of the lens based on identifying edges of the lens in the obtained image; and
converting the central coordinates of the lens into actual coordinates based on the fiducial markers.

7. The method of claim 1, wherein the determining of central coordinates of the light emitting device is performed after the light emitting device is mounted on the board and before the lens is installed to cover the light emitting device.

8. The method of claim 1, wherein the light emitting device mounted on the board is a plurality of light emitting devices, the plurality of light emitting devices are arranged in a longitudinal direction of the board, and the imaging, calculating, and comparing steps are performed individually for each light emitting device of the plurality of light emitting devices.

9. The method of claim 1, wherein the light emitting device is a light emitting diode (LED) chip or an LED package including an LED chip.

10. A method of inspecting a light source module for defects, the method comprising:
preparing a board having thereon a light emitting device and a lens covering the light emitting device;
applying a current to the light emitting device to turn on the light emitting device;
imaging the lens with the light emitting device turned on to obtain an image of the lens;
determining central coordinates of the lens from the obtained image of the lens;
comparing central coordinates of the light emitting device with the determined central coordinates of the lens to calculate an offset value between the central coordinates; and
comparing the offset value with a reference value to determine whether lens misalignment has occurred.

11. The method of claim 10, further comprising determining the central coordinates of the light emitting device mounted on the board,
wherein the step for determining the central coordinates of the light emitting device is performed after the light emitting device is mounted on the board and before the lens is installed to cover the light emitting device.

12. A method of manufacturing a light source module, the method comprising:
determining central coordinates of a light emitting device mounted on a board;
installing a lens to cover the light emitting device;
applying a current to the light emitting device to turn on the light emitting device;
imaging the lens covering the light emitting device with the light emitting device turned on to obtain an image of the lens;
determining central coordinates of the lens from the obtained image of the lens;
comparing the central coordinates of the light emitting device with the central coordinates of the lens to calculate an offset value between the central coordinates; and
comparing the offset value with a reference value to determine whether a lens is misaligned.

13. The method of claim 12, wherein the determining of central coordinates of the light emitting device is performed using automatic optical inspection (AOI).

14. The method of claim 12, wherein the determining of central coordinates of the lens comprises:
recognizing fiducial markers formed on the board and the position of the lens from the obtained image;
determining the central coordinates of the lens based on identifying edges of the lens in the obtained image; and
converting the central coordinates of the lens into actual coordinates based on the fiducial markers.

15. The method of claim 12, further comprising determining whether unsymmetrical light emission distribution has occurred from the light emitting device,
wherein the determining whether unsymmetrical light emission distribution has occurred comprises:
calculating central symmetry denoting a symmetry of light emission distribution from the center of the lens based on the obtained image; and comparing the calculated central symmetry with a reference value to determine whether unsymmetrical light emission distribution has occurred.

16. The method of claim 15, wherein the determining whether unsymmetrical light emission distribution has occurred in the light emitting device and the determining whether lens misalignment has occurred are performed based on the same obtained image.

17. The method of claim 12, wherein the installing of the lens comprises attaching the lens to the board using an adhesive.

18. The method of claim 12, wherein the light emitting device mounted on the board includes a plurality of light emitting devices, and the plurality of light emitting devices are arranged in a longitudinal direction of the board.

19. The method of claim 18, wherein the steps for determining central coordinates, for installing a lens, for imaging the lens, and for calculating central symmetry are performed individually for each light emitting device of the plurality of light emitting devices.

* * * * *